(12) United States Patent
Jetter et al.

(10) Patent No.: US 12,115,599 B2
(45) Date of Patent: Oct. 15, 2024

(54) METHOD AND DEVICE FOR PRODUCING RIBLETS BY LASER INTERFERENCE PATTERNING BY A LASER

(71) Applicant: 4JET MICROTECH GMBH, Alsdorf (DE)

(72) Inventors: Heinz Leonhard Jetter, Hückelhoven (DE); Tobias Dyck, Aachen (DE)

(73) Assignee: 4JET MICROTECH GMBH, Alsdorf (DE)

( * ) Notice: Subject to any disclaimer, the term of this patent is extended or adjusted under 35 U.S.C. 154(b) by 169 days.

(21) Appl. No.: 16/608,160

(22) PCT Filed: Apr. 25, 2018

(86) PCT No.: PCT/EP2018/060583
§ 371 (c)(1),
(2) Date: Oct. 24, 2019

(87) PCT Pub. No.: WO2018/197555
PCT Pub. Date: Nov. 1, 2018

(65) Prior Publication Data
US 2020/0139488 A1    May 7, 2020

(30) Foreign Application Priority Data
Apr. 26, 2017  (DE) .................. 10 2017 206 968.6

(51) Int. Cl.
*B23K 26/352*  (2014.01)
*B23K 26/067*  (2006.01)
(Continued)

(52) U.S. Cl.
CPC ........ *B23K 26/355* (2018.08); *B23K 26/0676* (2013.01); *B23K 26/08* (2013.01);
(Continued)

(58) Field of Classification Search
CPC ....... G01B 11/24; G01B 11/303; B64C 21/10; B64C 2230/26; B64C 1/12;
(Continued)

(56) References Cited

U.S. PATENT DOCUMENTS 4,706,910 A * 11/1987 Walsh .................. B64C 21/10
296/180.1
4,994,639 A * 2/1991 Dickinson ............ B23K 26/066
219/121.68

(Continued)

FOREIGN PATENT DOCUMENTS

CN  101916042 A  12/2010
CN  102236267 A  11/2011
(Continued)

OTHER PUBLICATIONS

Lasers in Manufacturing Conference 2017 Direct laser interference patterning: from fundamentals to industrial applications Tim Kunzea, Andrés F. Lasagnia,b,* (Year: 2017).*

(Continued)

*Primary Examiner* — Dana Ross
*Assistant Examiner* — Adam M Eckardt
(74) *Attorney, Agent, or Firm* — Lewis Roca Rothgerber Christie LLP

(57) ABSTRACT

Method and device for producing riblets by applying the riblets by laser interference patterning by a carbon dioxide laser.

20 Claims, 8 Drawing Sheets

Figure 1:
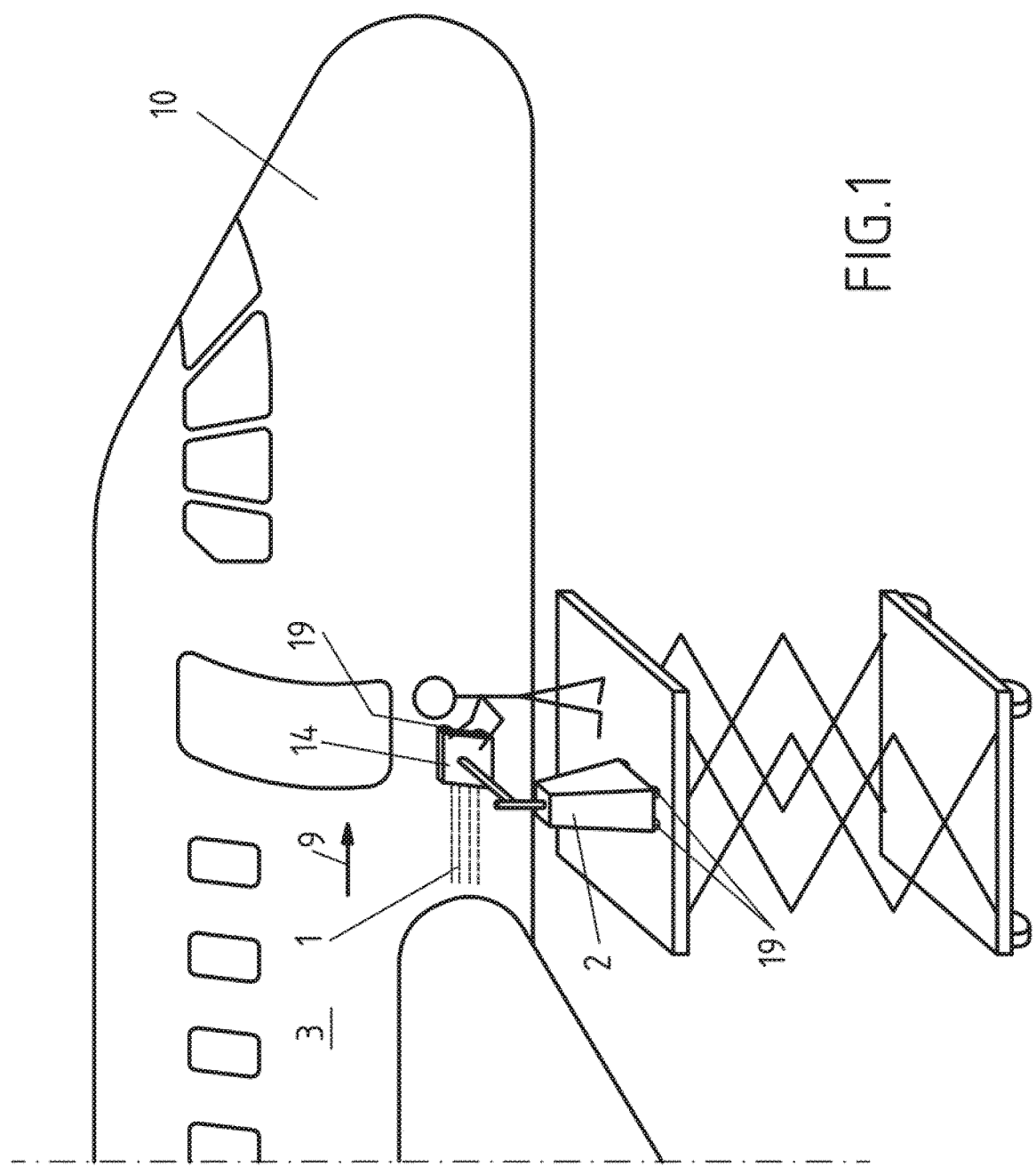

(51) Int. Cl.
  *B23K 26/08* (2014.01)
  *B23K 26/36* (2014.01)
  *B64C 21/10* (2006.01)

(52) U.S. Cl.
  CPC .......... *B23K 26/3584* (2018.08); *B23K 26/36* (2013.01); *B64C 21/10* (2013.01); *B64C 2230/26* (2013.01)

(58) Field of Classification Search
  CPC .. G01N 21/4788; G01N 21/956; G01N 21/00; Y02T 50/10; B05D 3/06; B05D 3/12; B05D 5/00; B29C 2059/023; B29C 33/3892; B29C 33/40; B29C 59/022; B29C 59/04; B29C 59/046; B29C 64/124; B29C 33/38; B29C 59/02; B29C 67/00; B23K 26/0604; B23K 26/0622; B23K 26/0676; B23K 26/08; B23K 26/082; B23K 26/352; B23K 26/355; B23K 26/3584; B23K 26/36; B23K 26/364; B23K 26/38; B23K 26/02; B23K 26/06; B23K 26/067; B23K 26/00; B23K 26/359; B29K 2833/00; B29L 2031/3082; B60J 1/2027; B60J 1/2033; B60J 1/205; B60J 1/208; B60J 1/20; G02B 26/12; Y02E 20/16; Y02E 20/18; B64F 5/10
  See application file for complete search history.

(56) References Cited

U.S. PATENT DOCUMENTS

| | | | | |
|---|---|---|---|---|
| 5,133,516 A * | 7/1992 | Marentic | ............... | B05D 5/02 244/130 |
| 5,529,813 A * | 6/1996 | Kobsa | ............... | B23K 26/3568 427/508 |
| 5,542,630 A * | 8/1996 | Savill | ............... | B63B 1/34 244/209 |
| 6,549,309 B1 * | 4/2003 | Monaghan | ............... | B23K 26/355 359/2 |
| 6,882,477 B1 * | 4/2005 | Schattenburg | ............... | G03F 7/70408 359/35 |
| 7,867,692 B2 * | 1/2011 | Amako | ............... | B82Y 30/00 430/22 |
| 7,969,650 B2 * | 6/2011 | Marks | ............... | G02B 21/0064 359/368 |
| 8,374,067 B2 * | 2/2013 | Usami | ............... | G03H 1/0402 369/103 |
| 8,681,315 B2 * | 3/2014 | Mao | ............... | G02B 26/0816 355/72 |
| 8,684,310 B2 * | 4/2014 | Rawlings | ............... | B32B 15/08 244/130 |
| 8,685,628 B2 * | 4/2014 | Raub | ............... | G03F 7/70408 430/320 |
| 8,988,752 B2 * | 3/2015 | Krebs | ............... | G02B 26/0816 359/201.1 |
| 9,365,792 B2 * | 6/2016 | Sasaki | ............... | F16J 1/04 |
| 9,741,823 B1 * | 8/2017 | Greene | ............... | H01L 29/66545 |
| 9,983,480 B2 * | 5/2018 | Yajima | ............... | G03F 7/2008 |
| 10,105,877 B2 * | 10/2018 | Rawlings | ............... | B32B 15/08 |
| 10,569,365 B2 * | 2/2020 | Song | ............... | B23K 26/364 |
| 11,325,208 B2 * | 5/2022 | Benner | ............... | B29C 65/1629 |
| 2004/0155203 A1 * | 8/2004 | Makimura | ............... | B23K 26/60 250/492.1 |
| 2006/0002656 A1 * | 1/2006 | Cowan | ............... | G02B 5/32 385/31 |
| 2007/0137803 A1 * | 6/2007 | Hansen | ............... | B60J 1/2033 160/370.22 |
| 2008/0311531 A1 * | 12/2008 | Wang | ............... | G03F 7/70408 430/394 |
| 2009/0058272 A1 * | 3/2009 | Kim | ............... | H05B 33/10 427/508 |
| 2009/0188543 A1 * | 7/2009 | Bann | ............... | B23K 26/364 219/121.69 |
| 2009/0323078 A1 * | 12/2009 | Yen | ............... | G03F 7/70408 356/500 |
| 2010/0102045 A1 * | 4/2010 | Durr | ............... | B23K 26/0622 219/121.72 |
| 2010/0187359 A1 * | 7/2010 | Rawlings | ............... | B64C 1/38 156/278 |
| 2010/0282909 A1 * | 11/2010 | Rawlings | ............... | B32B 15/02 156/60 |
| 2010/0309455 A1 * | 12/2010 | Soga | ............... | G01N 21/8806 356/51 |
| 2010/0314364 A1 * | 12/2010 | Lappalainen | ............... | G02B 26/12 219/121.67 |
| 2011/0073710 A1 * | 3/2011 | Rawlings | ............... | F15D 1/12 264/224 |
| 2011/0183111 A1 * | 7/2011 | Yuasa | ............... | B32B 27/36 428/141 |
| 2013/0062004 A1 * | 3/2013 | Amirehteshami | ............... | B29C 70/086 156/245 |
| 2013/0107278 A1 * | 5/2013 | Meyer | ............... | G01B 11/24 356/601 |
| 2013/0140743 A1 * | 6/2013 | Simon | ............... | B23K 26/082 425/174.4 |
| 2013/0140976 A1 * | 6/2013 | Yamamoto | ............... | B05D 3/10 313/325 |
| 2013/0146217 A1 * | 6/2013 | Kray | ............... | F15D 1/003 156/210 |
| 2013/0153553 A1 * | 6/2013 | Lasagni | ............... | B23K 26/355 219/121.68 |
| 2013/0156595 A1 | 6/2013 | Sander et al. | | |
| 2013/0193270 A1 * | 8/2013 | Rawlings | ............... | B64C 21/10 156/219 |
| 2013/0277341 A1 * | 10/2013 | Dvorkin | ............... | B23K 26/0676 359/204.3 |
| 2014/0130318 A1 * | 5/2014 | Rohr | ............... | B21C 1/00 29/17.2 |
| 2014/0176925 A1 * | 6/2014 | Xu | ............... | G01B 11/26 355/53 |
| 2014/0248469 A1 * | 9/2014 | Rawlings | ............... | B32B 27/34 156/182 |
| 2014/0291308 A1 * | 10/2014 | Lasagni | ............... | B23K 26/00 219/121.75 |
| 2016/0243586 A1 * | 8/2016 | Travis | ............... | B29C 33/40 |
| 2017/0081021 A1 * | 3/2017 | Song | ............... | B64C 23/005 |
| 2017/0090289 A1 * | 3/2017 | Yajima | ............... | G03F 7/2006 |
| 2017/0100877 A1 * | 4/2017 | Song | ............... | B29C 59/046 |
| 2017/0144255 A1 * | 5/2017 | Song | ............... | B23K 26/364 |
| 2017/0158905 A1 * | 6/2017 | Oomatsu | ............... | C08F 222/10 |
| 2017/0260088 A1 * | 9/2017 | Jetter | ............... | B23K 26/352 |
| 2017/0266691 A1 * | 9/2017 | Travis | ............... | B29C 59/04 |
| 2017/0297144 A1 * | 10/2017 | Nakanishi | ............... | B23K 26/0604 |
| 2017/0348797 A1 * | 12/2017 | Patzold | ............... | B23K 26/359 |
| 2017/0358249 A1 * | 12/2017 | Lasagni | ............... | B32B 27/308 |
| 2018/0043608 A1 * | 2/2018 | Shinoda | ............... | B32B 37/025 |
| 2018/0354161 A1 * | 12/2018 | Gu | ............... | B29C 33/3878 |
| 2019/0126532 A1 * | 5/2019 | Lanfant | ............... | B29C 59/022 |
| 2019/0262947 A1 * | 8/2019 | Guan | ............... | B23K 26/355 |
| 2020/0139488 A1 * | 5/2020 | Jetter | ............... | B23K 26/355 |
| 2021/0341756 A1 * | 11/2021 | Odhner | ............... | G02C 7/046 |
| 2022/0055739 A1 * | 2/2022 | Sullivan | ............... | B64C 23/005 |

FOREIGN PATENT DOCUMENTS

| | | |
|---|---|---|
| CN | 103848392 A | 6/2014 |
| CN | 103852975 A | 6/2014 |
| CN | 105398044 A | 3/2016 |
| DE | 102011011734 A1 | 8/2012 |
| DE | 10 2015 221 041 A1 | 7/2016 |
| EP | 0 205 289 A1 | 12/1986 |
| EP | 2 641 733 A1 | 9/2013 |
| EP | 3 170 743 A1 | 5/2017 |
| JP | H 5-77068 A | 3/1993 |
| JP | H 7-148583 A | 6/1995 |
| JP | 10139900 A * | 5/1998 |
| JP | H 10-13990 A | 5/1998 |
| JP | 2003-181658 A | 7/2003 |

(56) References Cited

FOREIGN PATENT DOCUMENTS

| | | |
|---|---|---|
| JP | 3 463486 B2 | 11/2003 |
| JP | 2003334683 A | 11/2003 |
| JP | 2017062348 A | 3/2017 |
| JP | 2017068444 A | 4/2017 |
| KR | 20110071081 A | 6/2011 |
| WO | 2011/072664 A1 | 6/2011 |
| WO | 2010047322 A1 | 3/2012 |
| WO | 2013186179 A2 | 12/2013 |
| WO | 2016199054 A2 | 12/2016 |
| WO | WO 2017/063040 A1 | 4/2017 |

OTHER PUBLICATIONS

Communication issued by the German Patent Office in corresponding German Application No. 10 2017 206 968.6, issued on Feb. 22, 2021, 11 pages.
"Kohlendioxidlaser", Wikipedia, 20210218085808000DE Feb. 18, 2021, https://de.wikipedia.org/w/index.php?title=Kohlendioxidlaser &o, Dec. 29, 2020, 5 pages.
Sumiyoshi, T. et al., "Ablation of Organic Polymers by TEA CO2 Laser", Journal of Photopolymer Science and Technology; vol. 7, No. 2 (1994); p. 361-368.
Marczak, Jan, et al., "Laser interference patterning of diamond-like carbon layers for directed migration and growth of smooth muscle cell depositions", Optica Applicata; vol. XLIV, No. 4, 2014, p. 575-586.
Dyck, Tobias, "Functional Surfaces by Laser Interference", Laser Technik Journal, Feb. 2017, p. 16-19.
Indrisiunas S. et al., "Direct Laser Beam Interference Patterning Technique for Fast High Aspect Ratio Surface Structuring", Proceedings of SPIE—The Society for Optical Engineering, vol. 9350, Mar. 2015.
Moon, J.H. et al., "Fabricating three-dimensional polymeric photonic structures by multi-beam interference lithography", Polymers for Advanced Technologies, vol. 17, 2006, p. 83-93.
Jain, VK et al., "Micromanufacturing: A review—part II", Journal of Engineering Manufacture, vol. 228(9), 2014, p. 995-1014.
Communication issued by German Patent Office in corresponding German Application No. 10 2017 206 968.6, dated Aug. 11, 2020, 2 pages.
Notification of the First Office Action issued in corresponding Chinese Application No. 201880042812.9, issued on Apr. 28, 2021, 14 pages.
German Examination Report of corresponding priority application DE 10 2017 206 968.6, dated Apr. 13, 2018, 7 pages.
2nd German Examination Report of corresponding priority application DE 10 2017 206 968.6, dated Jan. 30, 2019, 5 pages.
International Search Report with English translation of corresponding PCT/EP2018/060583, dated Jul. 11, 2018, 7 pages.
International Written Opinion of corresponding PCT/EP2018/060583, dated Jul. 11, 2018, 8 pages.
Lasagni, et al., "Large area micro-/nano-structuring using direct laser interference patterning" Proceedings of SPIE, SPIE LASE, 2016, San Francisco, CA, 11 pages.
D'Allessandria, et al., "Direct micro-patterning of aluminium substrates via laser interference metallurgy" Applied Surface Science, vol. 255, Issue 5, Part 2, Dec. 30, 2008, pp. 3210-3216, Abstract only 2 pages.
Notice of Reasons for Refusal for Japanese Patent Application No. 2019-559079, dated Mar. 7, 2022, 5pages.
Second Chinese Office action for 201880042812.9, dated Dec. 31, 2021, 9 pages.
Brazilian Office action for Application No. BR112019022431-9, dated Jul. 5, 2022, 11 pages.
Notice of Reasons for Refusal for Japanese Application No. 2019-559079, dated Aug. 19, 2022, 10 pages.
Korean Office action for Application No. 10-2019-7033205, dated Oct. 4, 2022, 11 pages.
Notice of Reasons for Refusal for Japanese Application No. 2019-559079, dated Feb. 13, 2023, 9 pages.
European Office action for Application No. 18720234.6, dated Jan. 15, 2024, 7 pages.
Korean Office action for Application No. 10-2019-7033205, dated Aug. 3, 2023, 6 pages.
German Oral Proceedings with partial English Translation for Application No. 10 2017 206 968, dated Nov. 8, 2021, 6 pages.
Bechert, D.W., et al., Experiments with three-dimensional riblets as an idealized model shark skin, Experiments in fluids 28, 2000, 10 pages.
Bechert, D.W., et al., Experiments on drag-reducing surfaces and their optimization with an adjustable geometry, J. Fluid Mech., vol. 38, 1997, 29 pages.

* cited by examiner

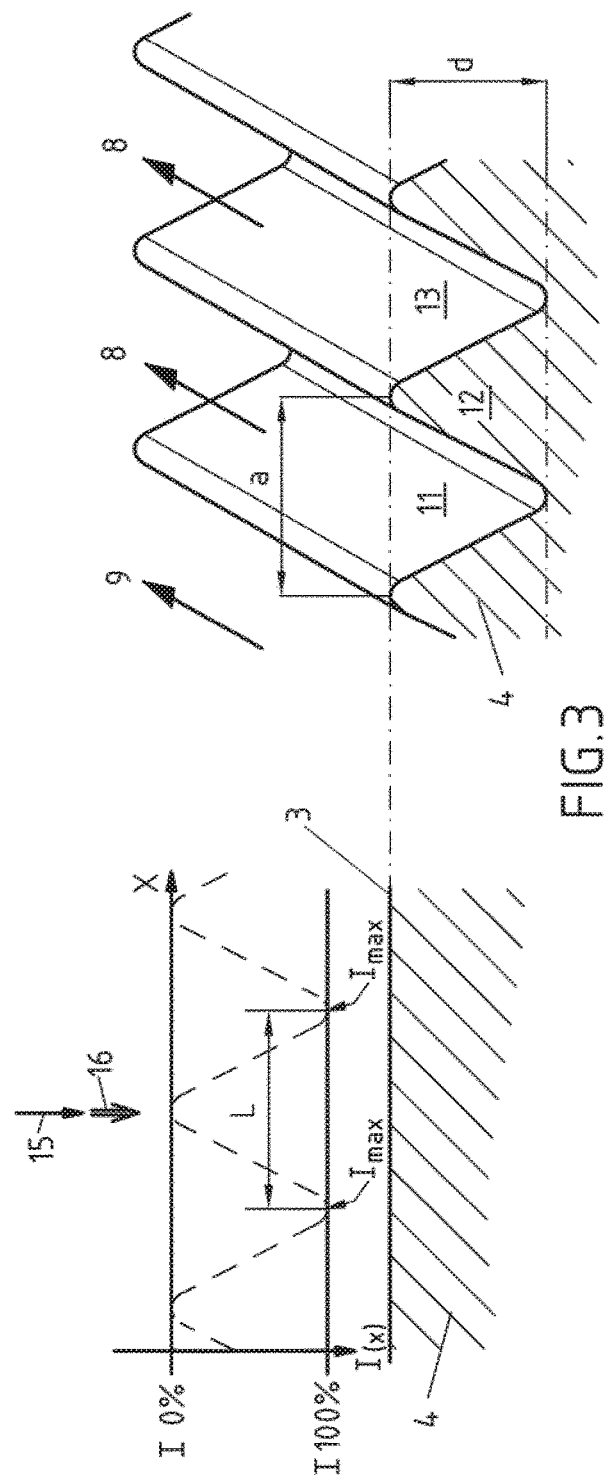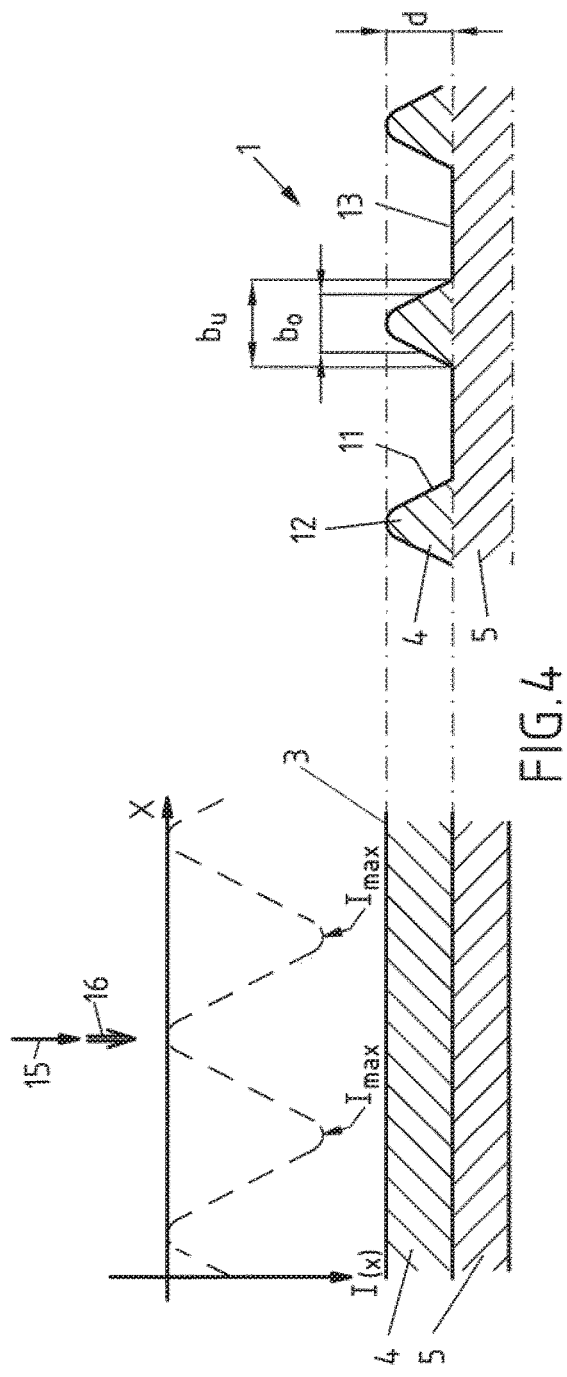

METHOD AND DEVICE FOR PRODUCING RIBLETS BY LASER INTERFERENCE PATTERNING BY A LASER

CROSS-REFERENCE TO RELATED APPLICATION(S)

This application is a National Phase Patent Application of International Patent Application Number PCT/EP2018/060583, filed on Apr. 25, 2018, which claims priority of German Patent Application No. 10 2017 206 968.6, filed Apr. 26, 2017, the entire contents of all of which are incorporated herein by reference.

DESCRIPTION

The invention relates to a method and a device for producing riblets as well as a corresponding produceable component with riblets.

It has been known for about 30 years that in turbulent flows the friction at a surface can be reduced by riblets. The discovery of riblets, whose terminology is based on the English word for "small ribs" or "ribs" and has established itself as a common technical term in the field of fluid mechanics goes back last but not least to the investigation of the surface geometry of scales of fast swimming sharks, which frequently have very fine grooves or ribs with very sharp rib tips. Compared to a smooth surface, by riblets the flow resistance can often be reduced by up to 10% whereby a basic rule is that the size of the riblets is adapted to the medium and the flow velocity and further it holds that the more pointed the ribs of the riblets are, the larger is the possible reduction of the flow resistance.

Long-haul aircraft fly at high altitudes at almost constant relative speed, wind turbine generators are operated in a narrow rotational speed range and merchant trips travel long distances at constant cruising speeds. Therefore, in those cases one can expect a positive effect by adapted riblets. Surprisingly, fluid dynamic calculations and laboratory investigations have shown that in all these cases, despite the very different ways of use, the suitable size of the riblets is in a range of 40 to 200 µm. The optimum value however must always be adapted to the characteristic operating conditions. Larger deviations can lead to reductions in the positive effect and may even be counterproductive.

In order to be able to use the fluid mechanical advantages of riblets also in aircrafts, ships and other components like rotor blades of wind turbine generators, which are adapted to be exposed to a flow during operation, it is desirable to be able to apply the fine riblet structures over a large area and within an economically acceptable processing time.

One of the currently known processes is the lamination of an aircraft surface with an adhesive film which has an embossed riblet structure. However, in this process, the ribs of the riblets can be provided pointed only to a limited extent so that the potential of a reduction of the flow resistance by the riblets regularly can be exploited only to a comparatively small extent. In addition, the embossed adhesive film is relatively thick and heavy compared to a normal painting and thus increases the weight of the laminated component. In addition, the adhesive film has to be removed elaborately by hand for repair work or new painting.

A further known method for producing riblets on an aircraft surface is based on a special paint system for the aircraft surface, a circumferential silicone band for embossing a riblet structure into the uncured paint and a subsequent UV light curing of the surface embossed in this way. The riblet structure is embossed into the silicone film as a negative image. The silicone film clings to the aircraft surface and transfers the structure into the freshly applied, still soft paint layer. In addition, the aircraft surface with riblets thus produced must continue to harden regularly for several hours at room temperature in order to fully cure and thus achieve the toughness and abrasion resistance required for flight operations. However, this process is very complex and error prone because the silicone film usually has to be guided over the partially free-formed aircraft surface with a regularly tightly defined contact pressure, preferably in exactly parallel tracks. The processing speed of approximately 1 $m^2$/min is comparatively slow and often uneconomical in view of the more than thousand square meters of of aircraft area.

SUMMARY OF INVENTION

On a laboratory scale, in a further method a riblet structure was applied into a turbine blade for turbo compressors by laser ablation. Herein, a focused laser beam was guided along the riblet grooves by means of a scanner. The processing speed achieved was 30 $mm^2$ per minute in this example. Even when it is considered that in this case a particularly tough steel was processed, an economic transfer of the process to an aircraft surface is hardly conceivable. If the riblets on the paint surface of an aircraft shall be generated by scanning a focused laser beam, the processing speed achievable in this way is limited and may be too low for economic use in certain applications. A riblet area of 1 $m^2$ with equidistant 100 µm wide grooves comprises $10^4$ m=10 km groove length. If a single laser beam were to be used for generating this groove length and hence for realizing the area rate of 1 $m^2$/min, an average scan speed of 167 m/s would be necessary which for the realization would be accompanied by a large technical effort. Because the common scan speeds today are typically in a range of several meters per second. The mentioned area yield could theoretically be achieved by a plurality of parallel partial beams, e.g. with ten or twenty parallel beams. A respective exact partition of the original laser beam and an individual focusing of each partial beam however involves a large technical effort and potentially a complex system with high adjustment effort due to the large number of components that would otherwise restrain each other.

It is an object of the invention to provide a further developed method together with device and component.

For solving the problem serve a method for producing riblets according to the main claim as well as a device and a component according to the secondary claims. Advantageous embodiments arise from the dependent claims.

For solving the problem serves a method for generating riblets, wherein the riblets are applied into a surface by direct laser interference patterning or DLIP—Direct Laser Interference Patterning—in particular in an already painted and cured surface.

Riblets denominate as known a surface geometry, also referred to as riblet structure, with fine ribs which have sharp rib tips.

The riblets (freely translated "small ribs" or "ribs") usually extend in a longitudinal direction. In particular, the longitudinal direction along a component is oriented parallel to an intended flow direction.

Two neighbouring ribs define a groove between the two neighbouring ribs. In principle, the groove has a groove width which corresponds to the distance of the opposite flanks of the two opposing ribs. What is meant is in principle the clear width of the groove, for example the distance of a right-hand flank of a first rib to the left-hand flank of a second rib positioned to the right of the first rib. A rib has a flank on each of both sides.

The groove in principle has a groove depth which corresponds to the rib height. In principle, two neighbouring ribs are in the longitudinal direction parallel or essentially parallel oriented with respect to each other, i.e. in particular with angular deviations <5°.

Two neighbouring grooves comprise a groove distance which is usually measured from groove middle to groove middle of the two neighbouring grooves. In principle, riblets comprise a groove depth which is approximately half of the groove distance, with a deviation smaller than 30%.

Riblets have in particular for the mentioned application types each a typical groove distance between 40 µm and 200 µm. For the case of a long-haul aircraft (i.e. typically about 850 km/h relative speed in approximately 10,000 m altitude), the distance between the grooves should for example preferably be 100 µm.

With this design or in an advantageous embodiment, the groove distance amounts to approximately 100 µm. In particular, the grooves should ideally then be 50 µm deep and have a rectangular cross-section. The bars between the grooves should be as narrow as possible. A frequent compromise between this aerodynamic requirement and the mechanical stability for the cross-section of the bars a vertically standing triangle has resulted which has at the upper tip in particular a flank angle of 30°. Such riblets may be used, as described above, with a long-haul aircraft, i.e. with a typical intended speed of approximately 850 km/h in an altitude of 10,000 m, particularly effective for reducing the flow resistance.

The producing of riblets by laser interference patterning enables the large-area application of riblet structures at particularly high process speed and thus enables a particularly economical, simple and flexible production of riblets on aircrafts, ships and wind turbine generators. Additional mechanical machining processes such as grinding are omitted.

DLIP is the abbreviation for Direct Laser Interference Patterning and is a well-known multi-beam laser interference technique in which interference is used specifically for micro-structuring of surfaces. Tests have shown that two beam laser interference structuring is particularly suitable for the generation of a riblet structure. For DLIP generally a sufficiently coherent laser light is used such that it can be divided into two identical partial beams which can interfere with each other. These partial beams are then overlapped under a defined angle on the paint surface. Since the wave structure of the partial beams is identical, in the overlapping range, regular zones with constructive and destructive interference arise, i.e. with maximum and minimum light intensity. Accordingly, on the paint surface by the intensity dependent laser removal there are formed parallel grooves the distance a of which is dependent on the wavelength $\lambda$ of the laser light and the combination angle $2\alpha$ between the two partial beams, wherein L is the distance of two neighbouring intensity maxima corresponding to the groove distance a: $L=\lambda/2 \sin \alpha$ (see FIGS. 3 to 6).

For a given wavelength $\lambda$, by varying the angle $\alpha$ the distance L and thus the riblet structure with the groove distance a can be advantageously adapted to the various application fields. Advantageous is further that the fineness of the structure is not created by a correspondingly strong focusing of the laser beam but is generated by the interference itself. In this way it is largely independent of the working distance of the processing head or optic head, respectively.

Advantageously, one designs the overlapping region of the partial beams as elongated rectangle (e.g. 100:1), by using cylindrical lenses for focusing the beams. This results in a relatively wide strip with riblet structure which is moved in transverse direction with a speed in a range of meter per second. Thus, the large area application of riblets with particularly high processing speed is enabled. Further, the method is particularly simple and flexibly applicable and thus enables the economic use of riblets in aircrafts, ships and wind turbine generators.

For a particularly effective laser patterning it is advantageous if the laser light is sufficiently strong absorbed by the paint. This means that the wavelength of the laser overlaps with a spectral absorption band of the paint. The depth of the laser removal can then in one embodiment be adjusted by the intensity and the impact time of the radiation. The impact time can in one embodiment be chosen such that the laser removal occurs faster than the dissipation of the energy by heat conduction. In this way, a "smearing" of the microstructure can be avoided. A riblet structure with for example $a=L=100$ µm is usually not significantly affected if the material dependent thermal diffusion length which is relevant for heat conduction, is <10 µm. For typical paint systems, this can be advantageously guaranteed if according to an embodiment the impact time of the laser radiation is <1 ms (for metals, this value is typically below 1 µs).

Both the top paints on aircrafts and wind turbine generators as well as the underwater paintings on ships are predominantly polyurethane systems (PUR). However, epoxy and acrylic systems are also used. For all these systems or typical coating systems, the absorption spectra show more or less pronounced overlaps with the emission range of the $CO_2$ lasers. This laser can be operated with selective wavelength in the range between 9 µm and 11 µm. Riblet structures of 40 to 200 µm can thus be generated in an embodiment according to the above formula with a combination angle $2\alpha$ in a range between 25° and 3°. Therefore, the $CO_2$ laser is a particularly suitable tool for patterning the mentioned paint systems. In an embodiment, the impact time of the laser radiation is smaller than 1 ms. The method is preferably adapted such that the energy absorbed by the paint within this time is sufficient to cause the material removal at the desired depth.

For the $CO_2$ laser, pulse durations <1 ms can be achieved by pulsed electrical excitation. Alternatively, one can, with a continuously emitting laser, adjust the size of processing field and the scan speed to each other in a way that an impact time smaller than 1 ms results.

The energy absorbed within a certain thickness of the paint is in principle dependent on the wavelength specific absorption coefficient and the intensity of the laser light. The $CO_2$ laser typically has two particularly intensive emission lines at 10.6 µm and 9.6 µm. In PUR systems, the absorption coefficient is 5-fold larger at 9.6 µm than at 10.6 µm. In order to deposit the same energy in a defined layer thickness, the laser intensity at $\lambda=10.6$ µm would therefore have to be 5 times higher than at 9.6 µm. In order to generate a riblet structure on a PUR surface with the 9.6 µm laser line, the energy density is preferably approximately 1 J/cm², wherein this value can be adjusted corresponding to the desired removal depth. For example, if one starts for 1 J/cm² from a 1 kW laser and 1 ms impact time for the overlapping region of the partial beams there results an area of 1 cm². If this area is designed as an elongated rectangle (100:1) therefrom it results as interference picture a 10 cm wide and 1 mm high strip which is guided over the surface with a speed of 1 m/s. This corresponds to 0.6 m²/min area yield or processing speed.

Preferably, the entire assembly for the surface processing is guided along the paint surface as a compact monolithic block. Herein it is of advantage that the method works contact-free and wear-free. The working distance is non-critical, especially as long as the partial beams on the paint surface overlap sufficiently. Even free form surfaces can therefore be treated without extremely complex path control.

The fact that the micro-structuring of paints with millisecond pulses of a $CO_2$ laser or even with a continuous $CO_2$ laser is possible, is surprising for experts. There the opinion prevails that for paints on polymer basis (e.g. PUR) with the relatively slow energy input, contrary to the observation made, soot formation and other undesirable decomposition and melt effects occur. Obviously, micro-structuring is always mistakenly thought of as laser ablation; a process in which nanosecond pulses locally generate a sudden temperature increase that causes material to flake of without suit formation.

For the structuring or texturing of painted surfaces with lasers to achieve structures in the micrometer range, the impact time of the laser radiation is in particular smaller than 1 ms so that the pattern is not "smeared" as a result of thermal diffusion. Corresponding impact time can be achieved by suitably selecting the scan speed and the geometry of the processing area or by clocking the electrical excitation of the laser.

In an embodiment, the riblets are applied into an already painted surface which is suitable for being exposed to a flow during operation, subsequently by means of laser interference patterning. Already painted surface means that the paint is already cured and that the surface is in principle ready for the later operation. By the subsequent application of the riblets, only the flow resistance is reduced.

In an embodiment, the laser is a $CO_2$ laser. A particularly high absorption degree can thus be achieved in common paints, in particular in paints on PUR basis.

In an embodiment, the laser is a continuous wave $CO_2$ laser. Such lasers with corresponding focusing and coherence properties are in industrial use in a power range up to multi kW for the material treatment.

In an embodiment, the laser, in particular $CO_2$ laser, adapted for emitting a laser beam with a wavelength of 9.3 μm, 9.6 μm or 10.6 μm and the riblets are applied into a paint, in particular clear paint, on the basis polyurethane or acrylics or epoxy. Riblets with particularly high quality with particularly clean grooves and ribs can be generated in this way. In particular by using a $CO_2$ laser which is operated in the 001 to 020 band at the wavelength $\lambda=9.6$ μm, riblets in surface paint in the form of a polyurethane system can be applied with particularly high processing speed and quality.

Interfering laser radiation comprises preferably two beam bundles which are directed onto the surface in a way that the two beam bundles interfere with each other. The two beam bundles and hence the interfering laser radiation may be generated in particular by beam dividing of the original laser beam so that the interfering laser radiation applies to the surface a corresponding distributed energy. The interfering laser radiation generates a sinusoidal interference structure on the surface with periodically side by side arranged interference maxima in a distance L from each other. By synchronously moving the two beam bundles in longitudinal direction, a plurality of grooves arranged side by side is formed.

Assuming an intensity conforming material removal the sinusoidal intensity profile generates a sinusoidal height profile on the paint surface.

Ideally, for the grooves of the riblets in an embodiment the ratio of width to depth should be 2 to 1 and the bars should in particular be as thin as possible. With a sinusoidal height profile with 2/1 width to depth, the peaks and values are extremely flat. This means that there are usually no pronounced bars. Therefore, such riblets can be effective only to a limited extent. If a sinusoidal profile with sharp tips is desired, in particular the amplitude of the wave has to be adjusted to be large compared to its period. However, since for example the groove width and hence the period is fixed at 100 μm, this would result in a theoretical value larger than 500 μm for the groove depth, which in turn would be in contradiction to the functionality of the riblets.

Conventional aircraft paints are in particular 100 to 150 μm thick, and thus essentially thinner than the above theoretical removal depth. These are multi-layer systems, which consist essentially of the primer, the base paint with colour pigments and the dear paint top layer. The transmission properties of the different layers are different for the laser light. For example, IR radiation with a wavelength of $\lambda=9.6$ μm, due to the corresponding PUR absorption band is absorbed to a substantial amount in the PUR clear paint layer and can generate there, provided that the intensity is suitable, grooves with relatively sharp bars therebetween. In the epoxy base paint arranged below the absorption of the 9.6 μm radiation is much smaller so that from the beginning less material would be removed. Additionally, the base paint comprises finely suspended titanium dioxide pigments which lead, due to its strong scattering properties, to a homogenization of the light intensity and hence to a smearing of the interference structure. Therefore, an essential material removal in the base paint layer does not take place. This layer hence forms a barrier and limits the further depth removal in the grooves. Hence, in an embodiment, the depth of the riblet grooves is thus determined by the thickness of the clear paint layer.

According to an embodiment, the riblets are generated by a laser beam and additional laser beam, wherein the laser beam and the additional laser beam are positionally displaced by an offset ΔL transverse to an advance direction or transverse to a longitudinal direction of the riblets onto a surface for producing the riblets. Longitudinal direction of the riblets means longitudinal direction of the ribs and/or grooves of the riblets. Advance direction means the direction of a relative movement of the laser beam and/or the additional laser beam relative to the surface. Riblets with particularly steep flanks, i.e. walls, and particularly slim ribs, i.e. bars, can be generated in this way.

According to an embodiment, the additional laser beam is emitted from an additional laser or the additional laser beam is generated by dividing the laser beam or by separating or branching off from the laser beam. In a further embodiment, the additional laser beam corresponds to the laser beam, however offset in time, e.g. at a later treatment path over the same surface region. In all these three embodiments it is enabled that by means of one or more lasers at least two intensity maxima at a distance L transverse to the advance direction of a laser beam, additional laser beam and/or partial beam are generated, in fact simultaneously or temporally offset. During a relative movement in the advance direction, these intensity maxima map themselves as grooves on the surface. Particularly small ribs between two of such grooves can be generated in this way. Additionally, transverse to the advance direction, overlapping grooves can be generated wherein both flanks of a rib between two of such overlapping grooves each can be generated temporally offset or by different laser beams or partial beam.

According to an embodiment, by means of the laser the riblets are applied into an outer paint layer and/or a base paint layer positioned below the top paint layer comprises, compared to the top paint layer, a low absorption level for the wavelength of the laser, i.e. for the wavelength of the laser beam emitted by the laser or, respectively, the interfering laser radiation.

Preferably, the top paint layer is a clear paint layer, in particular on polyurethane basis. The base paint layer is preferably a plastic and/or resin, particularly preferred an epoxy resin.

In an embodiment, the base paint layer located below the top paint layer is partially exposed by means of the laser. In a further embodiment, an underlayer located below a material layer is partially exposed by means of the laser, wherein the material layer can be the top paint layer and/or the underlayer can be the base paint layer. Partially exposed means that in one or more parts the underlayer is not covered by the material layer or the base paint layer is not covered by the top paint layer. At this part or these parts, the surface can be formed by the underlayer or, respectively, the base paint layer. By the partial exposure of the underlayer or the base paint layer, a particularly flat valley area or even base of a groove of a riblet is made possible. A particular effective reduction of the flow resistance is possible.

In a further development, the absorption level of the base paint layer is smaller than the absorption level of the top paint layer in a manner that the processing threshold or threshold intensity of the laser beam or the interfering laser radiation provided for material removal is reached or exceeded in the top paint layer but not in the base paint layer.

In a further development, the base paint layer contains $TiO_2$ particles for achieving, compared to the top paint layer, a low absorption for e.g. the wavelength $\lambda=9.6$ µm of a $CO_2$ laser and/or to avoid the reaching of the processing threshold or threshold intensity for a material removal.

The energy introduced by the laser into the top paint layer or the material layer causes material removal in such a way that the intensity distribution of the laser beam or, respectively, the interference structure maps itself with an at least approximately corresponding shape of a recess or groove in the top paint layer or the material layer.

Due to the lower absorption, in particular below the processing threshold or the threshold intensity for a material removal in the base paint layer, the intensity distribution does not map itself in the base paint layer. The in particular even top face of the base paint layer which abuts the top paint layer and which is at least partially exposed by the laser can thus be maintained.

This is of advantage in particular for the reasons described below.

Basically, the more rectangular the cross-section, the greater the reduction in flow resistance.

Furthermore, the more pointed the in particular bar-like ribs or bars between the grooves are, i.e. the smaller, the higher is the reduction of the flow resistance.

According to an embodiment, the riblets are applied into the surface of an aircraft, a ship or the rotor blade of a wind turbine generator. A particular effective reduction of the flow resistance can thus be achieved.

A further aspect of the invention relates to a device for performing the above-described method for producing of riblets with a laser adapted for the producing of riblets or continuous wave laser, in particular $CO_2$ laser. The embodiments of this device are already apparent from the description of the method. In particular, the device comprises at least one laser and an optical head with at least one beam splitting devices and at least one focusing devices.

Riblets which have been produced by a continuous wave laser show a continuously generated groove, wherein isolated traces of melting and/or decomposition effects may be observable.

Figure 5:
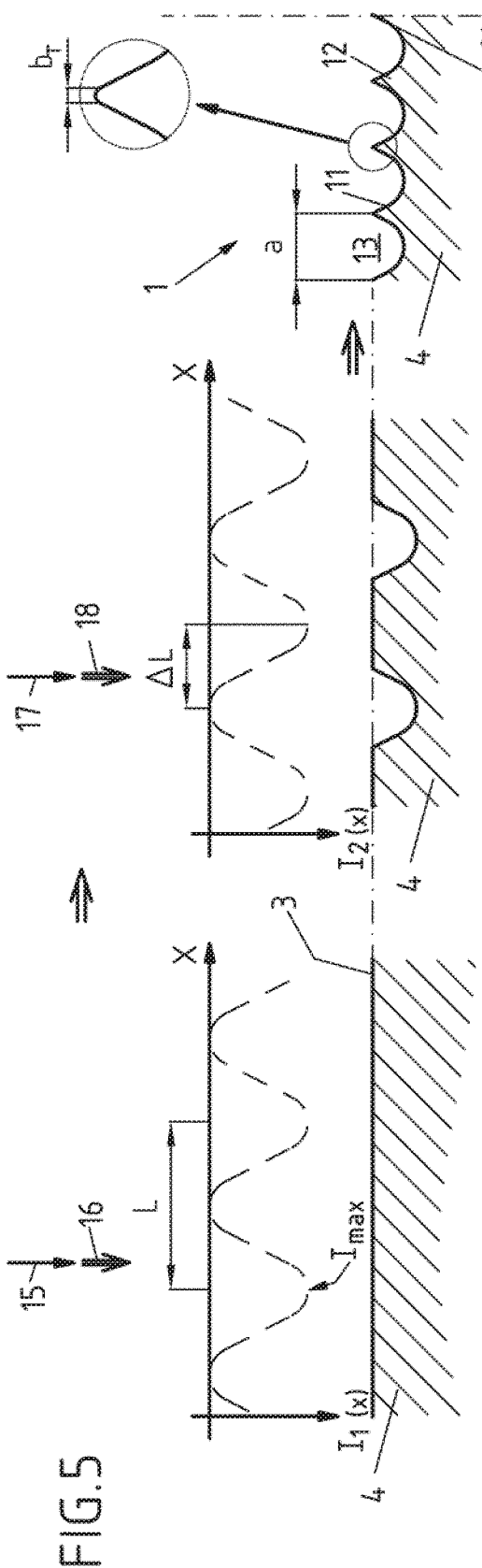

In particular, by means of laser riblets with very sharp ribs with a rib tip width $b_T$ of at most 1 µm or 2 µm may be generated, in particular as shown in FIG. 5 measured transverse to the longitudinal direction and/or measured exactly 1 µm below the highest point of the rib tip.

In particular by means of laser riblets with very sharp ribs with a width of the rib of at most 30% or 40% of the groove distance can be generated, wherein with the width of the ribs the extent transverse to the longitudinal direction is meant, namely measured in a distance below the highest point of the rib tip of in particular a third of the groove depth or the rib height.

In particular, the riblets exhibit flanks of ribs between grooves which map an intensity distribution of a laser beam or an intensity distribution of an interference structure, i.e. a portion of a corresponding measurement curve of the intensity I over an axis x on the surface transverse to the advance direction.

Figure 2:
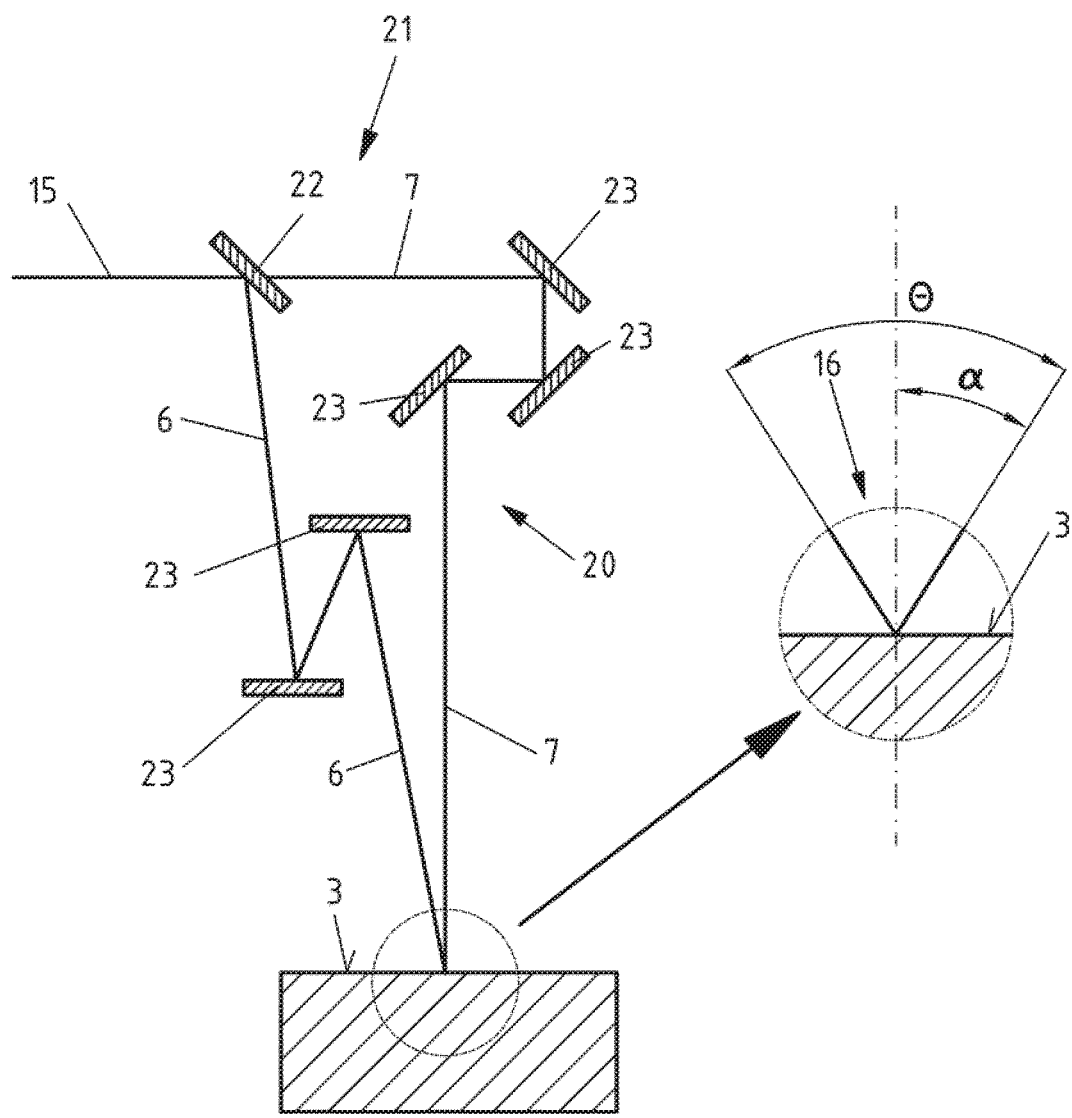
Figure 6:
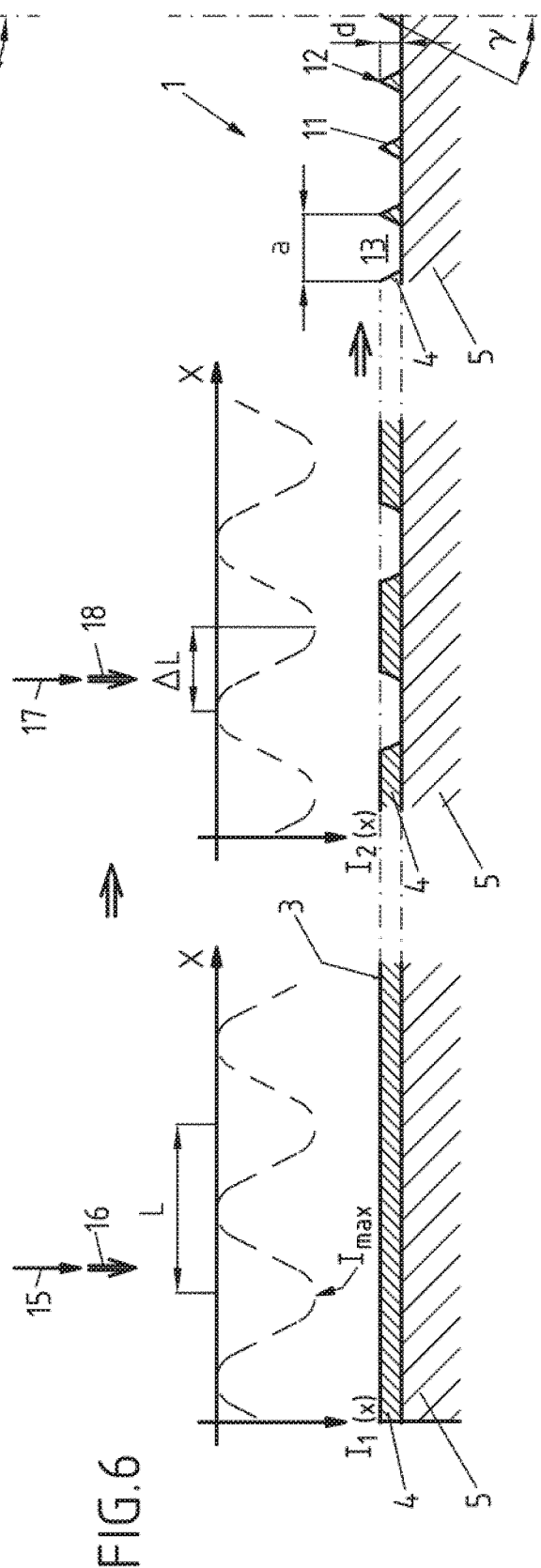
Figure 7:
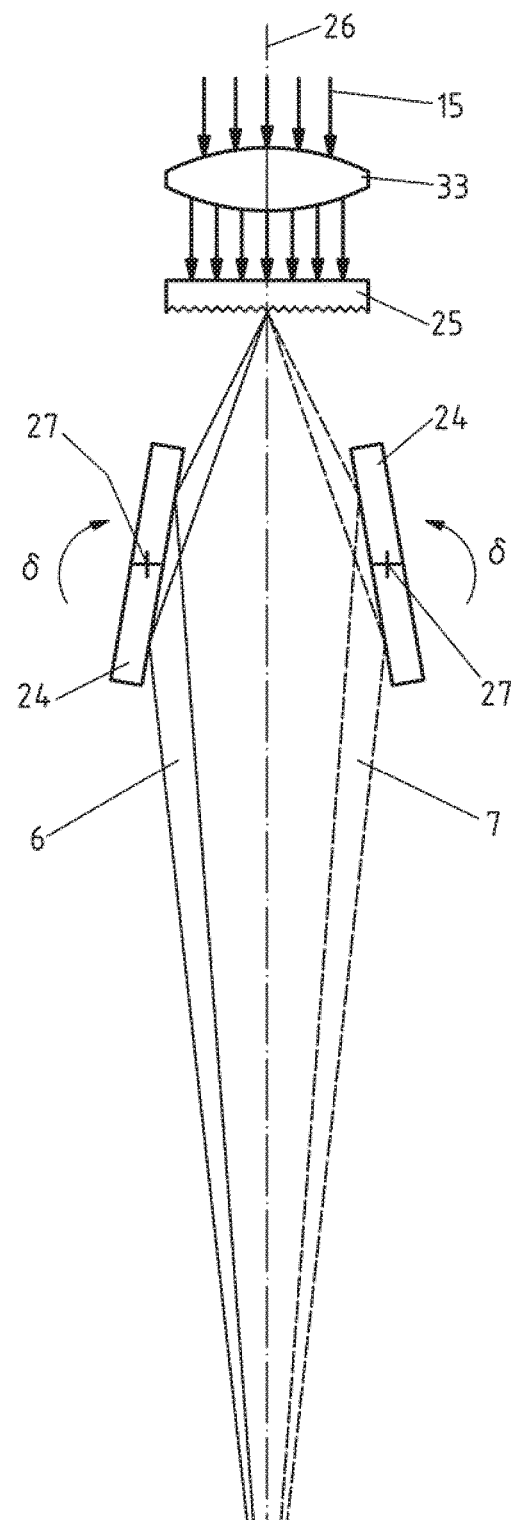
Figure 8:
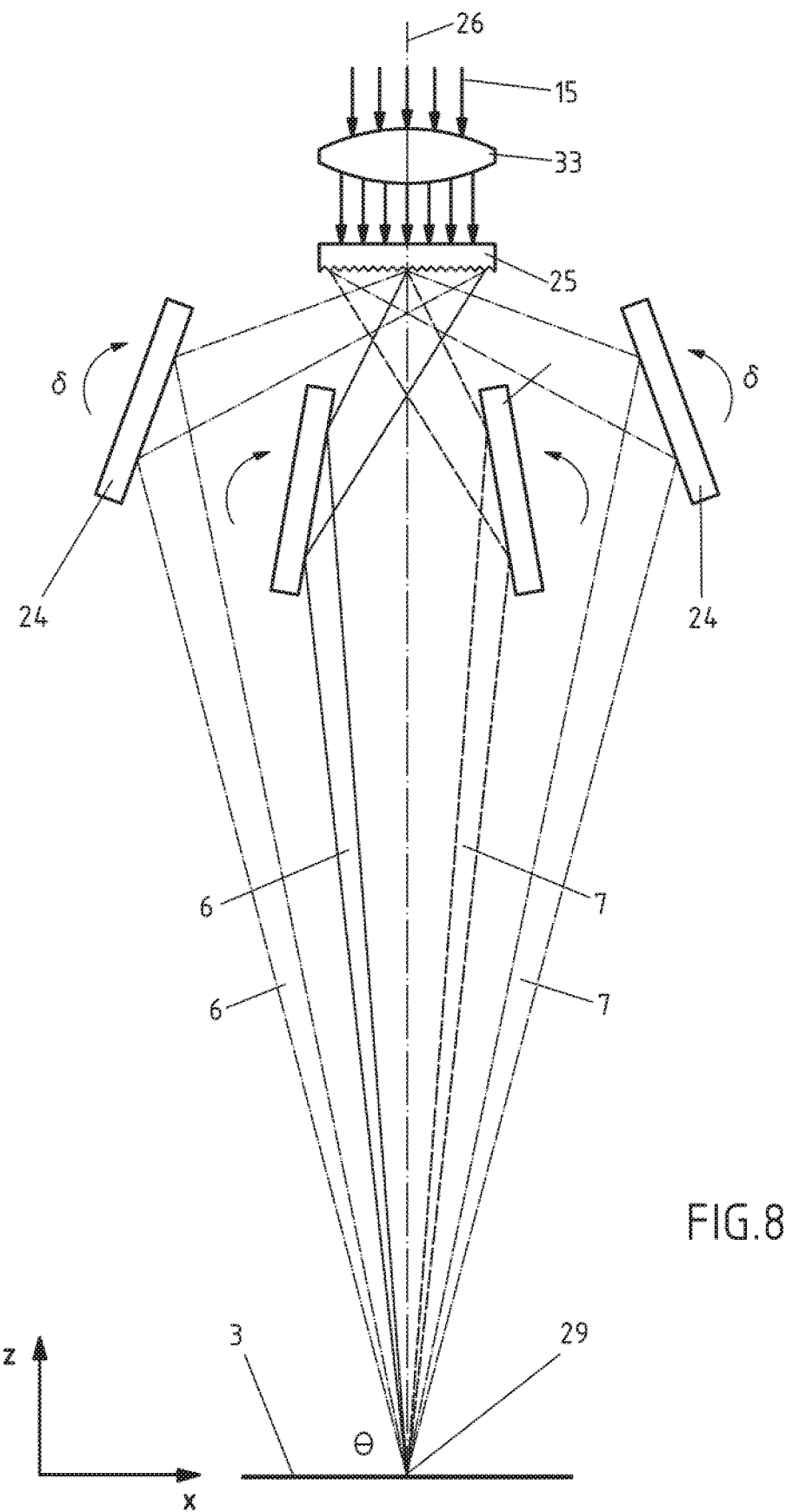
Figure 9:
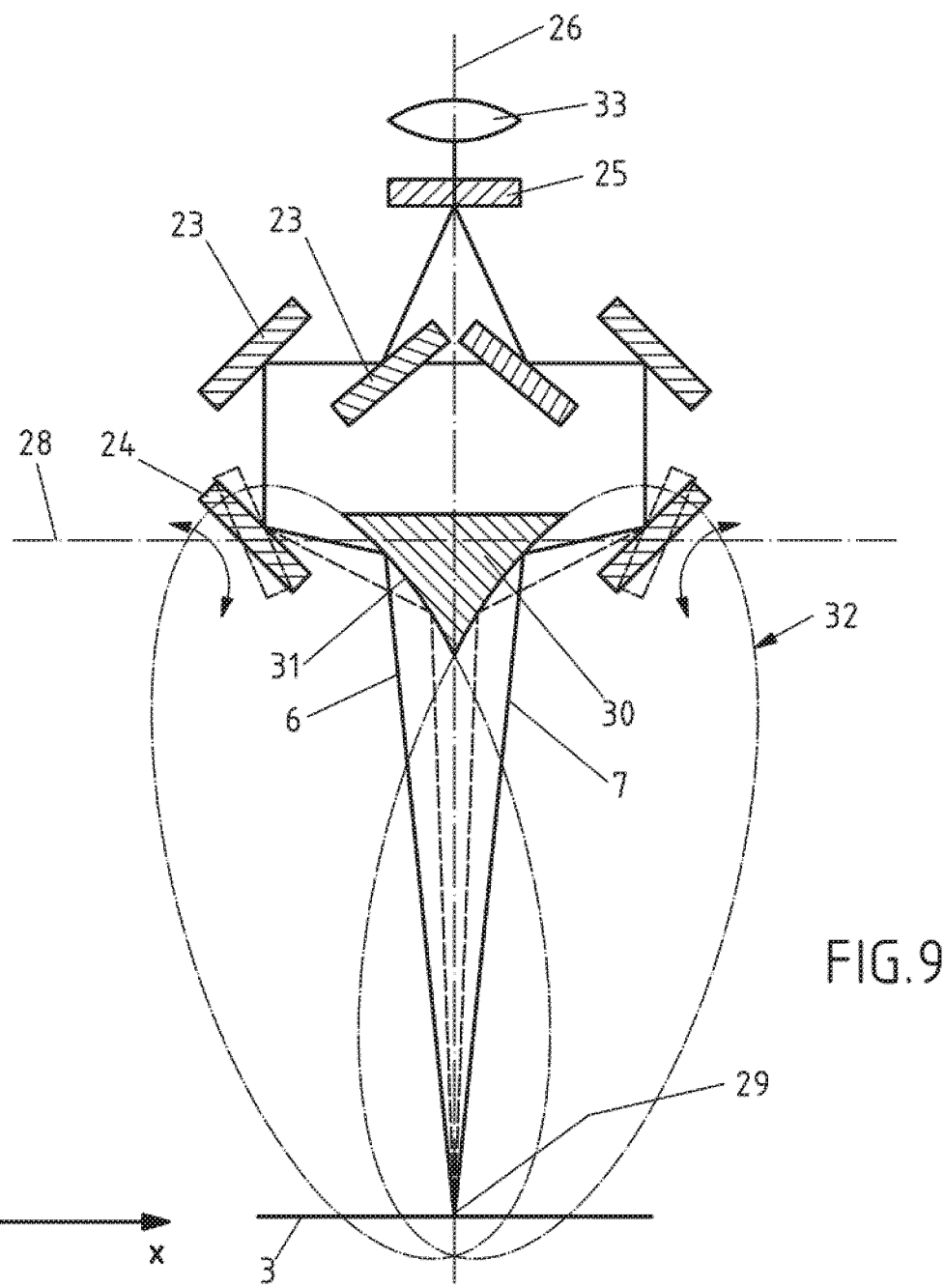
Figure 10:
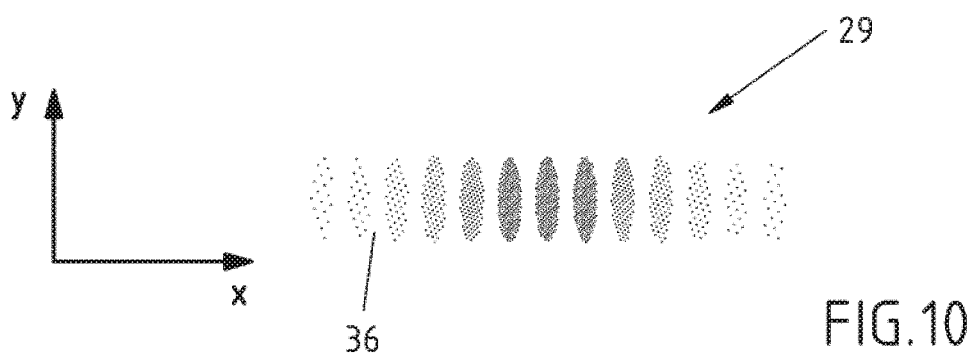
Figure 11:
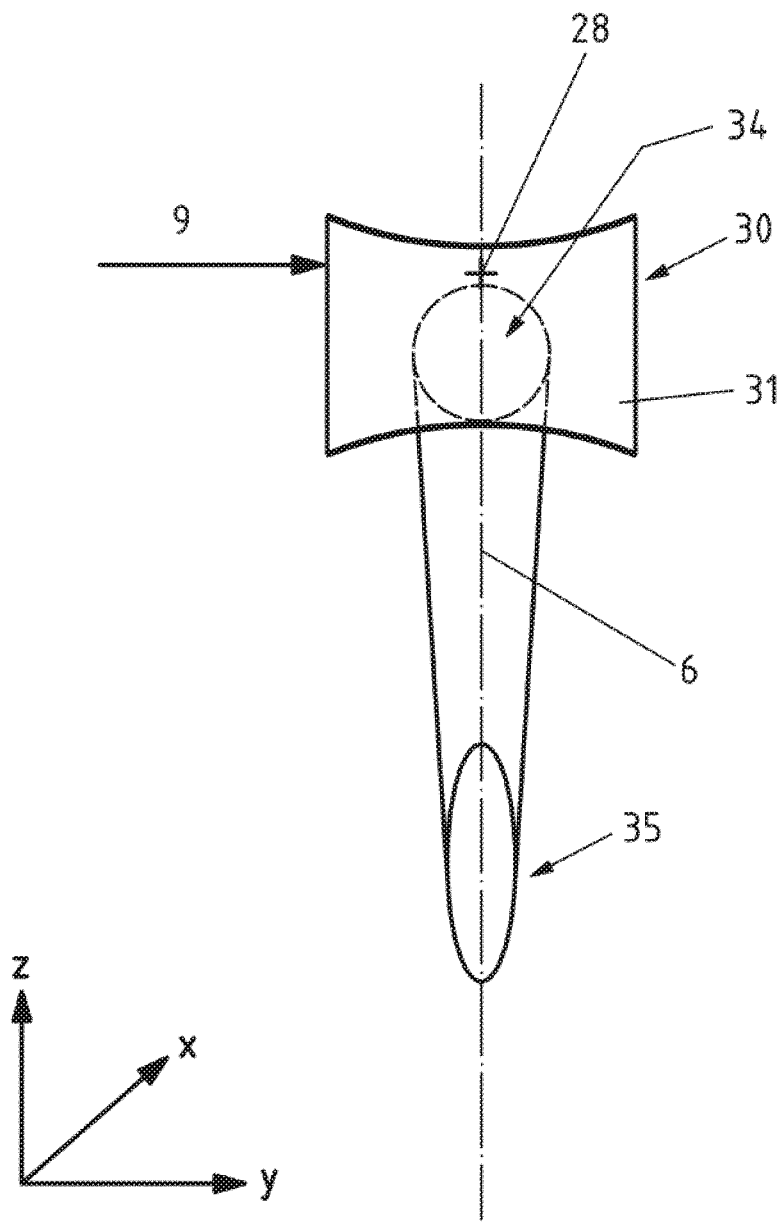

Shown is:

FIG. 1: a schematic representation of the production of riblets by means of a laser subsequently onto an already painted aircraft surface;

FIG. 2: a schematic representation of a beam splitting and focusing device for generating an interference structure on a surface;

FIG. 3: a schematic representation of the mapping of an interference structure into a material layer;

FIG. 4: a schematic representation of the mapping of an interference structure into a top paint layer and an underlying base paint layer;

FIG. 5: a schematic representation of a producing of riblets by the locally offset introduction of laser radiation into a material layer;

FIG. 6: a schematic representation of a producing of riblets by the locally offset introduction of laser radiation in a surface with a top paint layer and a base paint layer;

FIG. 7: a schematic representation of an optical assembly with two tiltable deflection mirrors for deflecting of partial beams onto the surface;

FIG. 8: a schematic representation of an optical assembly with four tiltable deflection mirrors for deflecting of partial beams onto the surface;

FIG. 9: a schematic front representation of an optical assembly with two tiltable deflection mirrors and an optical deflection body;

FIG. 10: a top view onto an elongated laser spot;

FIG. 11: a schematic spatial side representation of an optical assembly with two tiltable deflection mirrors and an optical deflection body.

In the following, the invention will be explained in more detail by means of the examples of execution schematically shown by the drawings and by reference to the drawings the embodiments as well as additional advantageous designs will be described in more detail.

FIG. 1 shows an exemplary device for generating of riblets 1 in the already painted surface 3 of aircraft 10, for example after a new or repainting or during a maintenance, wherein the riblets 1 are produced by means of a continuous wave laser 2, in particular a $CO_2$ laser. The surface 3 is also already dried and cured at the beginning of the laser treatment. No additional material removing tools such as grinding are used.

A movement unit of the type of a five axis robot 14 is provided which is adapted such that a laser beam 15, interfering laser radiation 16 an additional laser beam 17 and/or additional interfering laser radiation 18 can be moved relative to the surface 3, preferably motorized by means of a driving mechanism and/or automatically by means of a control for the driving mechanism. A large area laser patterning or DLIP with particularly high area rate can be realized in this way. The movement unit 14 includes a focusing device 20 and/or a beam splitting device 21, preferably as a compact constructional unit so that a defined spot diameter can be set on the surface 3 which remains constant in particular also during the relative movement. The continuous wave laser 2 is coupled over a movable beam guiding device with the focusing device 20 and/or a beam splitting device 21 so that the movement unit 14 can be moved independent of the standing continuous wave laser 2. The processing takes place in advance direction 9 as shown in FIG. 1.

In general, aircraft paintings are multi-layer systems. In principle, such multi-layer systems for aircraft paintings consist of a primer as corrosion protection and adhesion promoter, a base paint of the base paint layer 5 in particular with colour pigments and/or a clear paint of the top paint layer 4. The base paint is usually a multi-component epoxy resin coating. In contrast, the clear paint is based preferably on a polyurethane system (PUR). In order to not adversely affect the optical appearance of the aircraft surface it is advantageous to apply the riblet structure into the in particular transparent top paint layer 4. If the top paint layer is carried out on a polyurethane basis it possesses an IR absorption structure in the emission region of the $CO_2$ laser. In particular, a characteristic PUR absorption band overlaps with a particularly strong emission wavelength ($\lambda=9.6$ µm) of the $CO_2$ lasers. If a riblet structure, i.e. riblet 1, with a groove distance $a=100$ µm shall be produced, for a wavelength $\lambda=9.6$ µm for the angle $\theta$ between the two partial beams 6, 7, there applies the equation 2, $\theta=5°\ 30'$.

FIG. 2 shows an exemplary optical assembly of a beam splitting device 21 and focusing device 20 for converting a laser beam 15 into an interfering laser radiation 16. The following statements are valid in an analogous way for an additional laser beam 17 which is converted into an additional interfering laser radiation 18.

The incident laser beam 15 is split as shown in FIG. 2, at a preferably non-polarizing beam splitter, preferably a semipermeable mirror 22, into a first partial beam 6 and a second partial beam 7.

In an analogous way, the incident laser beam 15 can be split in an alternative or additional embodiment in a way such that two different laser beams with each only one intensity maximum $I_{max}$ can draw a groove 13 in the surface 3.

In the exemplary optical assembly of FIG. 2, the partial beams 6, 7 are directed onto the surface 3 by means of optical mirrors 23 such that they impinge there under a predetermined angle $\alpha$. The distance L is generally dependent on the wavelength $\lambda$ of the laser light and on the combination angle $2\alpha$ between the two partial beams 6, 7, namely in particular according to the equation $L=\lambda/2 \sin \alpha$. Preferably, the equation $\theta=2\alpha$ is valid, i.e. both partial beams 6, 7 impinge under the same angle $\alpha$ onto the surface 3.

In particular, the entire optical assembly with beam splitting device 21 and/or focusing device 20 is designed as a compact monolithic block. This block can therefore particularly simple be guided along the surface 3 of the aircraft 10 or the aircraft component. Herein, it is advantageous that the removal method—with exception of the rolls—works contact-free and wear-free. In a further development, the movement unit is moved contact-free over the surface. In this way, even a contact of the surface by rolls is avoided. Due to the use of an interfering radiation, a particularly large tolerance range regarding the working distance, i.e. the focus position relative to the surface 3 can be enabled.

Preferably, the working distance is over a region perpendicular to the surface 3 in a tolerance range in which the partial beams 6, 7 on the surface 3 overlap sufficiently strong for a planned removal, e.g. for example the intensity maxima $I_{max}$ still reach the desired threshold intensity. Even free form surfaces can thus be processed without extremely complex path control which is usually used to adjust the focus position by the focusing device to height differences of the surface.

In order to produce a desired riblet structure or riblets 1 using a laser, several approaches can be selected which are described in the following using alternative or supplementary embodiments. Due to the according to an embodiment freely and continuously adjustable angle $\alpha$, the distance L of the intensity maxima $I_{max}$ of an in particular periodic distribution of the laser intensity I(x) over a transverse axis x perpendicular to the advance direction 9 or the longitudinal direction 8 of the riblets on the surface 3 can be adjusted. According to an embodiment, the in particular periodic intensity distribution may be a modified sine function, sine-like or sinusoidal.

FIG. 3 illustrates how the intensity I(x) at a position of the transverse axis x can correlate with the removal depth such that this intensity distribution is transferable to the height profile of the surface 3.

According to an embodiment, the thickness of the top paint layer 4, in particular made of clear paint on PUR basis, is equal or larger than the desired groove depth d of the riblets 1, i.e. the height of the ribs 12.

FIG. 4 shows a surface 3 in which below a material layer or top paint layer 4, respectively, an underlayer or base paint layer 5 is positioned, wherein the intensity I(x) of the laser radiation at an intensity maximum $I_{max}$ is so high that the material layer or, respectively, the top paint layer 4 is partially entirely removed and the underlayer or, respectively, base paint layer 5 is hence partially completely exposed. Partially here means the location of the surface 3 at which an energy of the laser with the intensity maximum $I_{max}$ is introduced.

In FIGS. 3 and/or 4, the laser radiation is in particular the interfering laser radiation 16 which was preferably obtained by converting the laser beam 15. Alternatively or additionally it is in general also possible to generate the grooves shown in FIGS. 3 and 4 by timely and/or locally offset non-interfering laser beams which in sum generate the shown intensity distribution.

Since the wavelength of the laser light emitted by the laser in one embodiment is selected such that it is absorbed in the top paint layer 4 but hardly penetrates into the base paint layer 5 due to the strong scattering at the $TiO_2$ pigments, the removal process effected by the laser stops automatically at the base paint layer 5 (see FIG. 4).

The groove depth d corresponds then to the thickness of the top paint layer 4, wherein the groove distance a corresponds to the distance L of the intensity maxima $I_{max}$. A groove 13 with particularly flat sole, i.e. flat groove base, and steep flanks 11 of the ribs 12 can thus be achieved by using the self-stopping removal process at the underlayer or, respectively, base paint layer 5.

FIG. 5 schematically shows a two-step producing of riblets 1 by the locally offset introduction of laser radiation 16 in a first processing step and of additional laser radiation 18 in a second processing step.

For reasons of clarity, in FIG. 5 the intermediate product by the first processing step is shown before performing the second processing step. The first processing step and the second processing step however can be performed also simultaneously. The two-step processing process enables the generation of riblets with particularly steep flanks 11 and pointed ribs 12.

The groove width, the groove depth, the groove distance and/or the ratio of groove depth to groove distance can be adapted preferably to the size of the energy consuming vortices at the surface 3 of the component which would form during operation of the component at a typical flow speed on a smooth surface. Ideally would be to provide for example at a long-haul aircraft 2 μm wide and preferably rectangular or rectangle-like ribs 12 between the grooves 13.

However, such a riblet structure can hardly be produced economically today and the mechanical stability would also usually not be sufficient for practical use. Therefore, a compromise between aerodynamics and mechanical stability with approximation of the ideal structure is usually strived for with riblets. The energy-consuming vortices are basically dependent on the flow velocity, the viscosity and the density of the flow medium.

By a component with a surface 3 with riblets 1 with 100 μm groove distance of preferably approximately 100 μm and/or a groove depth of approximately 50 μm can reduce the total flow resistance, which is not only caused by the surface friction, by up to 3% in a long-haul aircraft in a phase of reasonably constant flight velocity. Accordingly, also the fuel consumption can drop.

With wind turbine generators (WTG), with an ideal friction-free flow up to 60% of the wind energy can be converted into mechanical energy of the rotor. The limitation is due to the fact that behind the rotor the wind speed is reduced but the air must continue to flow out in order that the back pressure does not block the rotor.

In WTGs, aerodynamic losses such as vortex formation and wall friction at the rotor blades reduce the actually usable mechanical energy to about 50%. In fact, the circumferential speed of the rotor tips is only about ⅓ of the aircraft speed but the density of the air at the ground is three times higher than in 10,000 m altitude. Since the Reynolds number has an influence on the preferred size of the riblets 1 and the Reynolds number contains the product of density and velocity, the size of the riblets will basically be in the range of 100-200 μm. The exact size depends in particular on the projected rotational speed of the WTG and varies on the rotor blade with the distance to the axis of rotation. The wall friction can thereby be reduced by up to 10% wherein the efficiency of the WTG can improve itself by 1% to 2%.

In an embodiment, the riblets 1 are generated by in particular continuous or step-wise increase or decrease of the overlapping angle α of the two partial beams 6, 7 so that the riblets in particular transverse to the longitudinal axis 8 comprise a decreasing or increasing groove width L. The riblets 1 on a rotor blade (not shown) can hence be particularly simple and effectively adapted to the circumferential speed increasing with increasing distance to the hub.

In a further embodiment, in merchant ships the underwater areas can be equipped with riblets 1. The 10 to 20 knots typical for the cruising speeds of these ships require riblets with groove widths between 80 and 200 μm. Such riblets 1 can be applied into the underwater paint using DLIP.

The above-mentioned embodiments and exemplary applications show that the method, the device and the components or surfaces, respectively, generatable therewith can be used in a wide range of applications.

Herein particularly advantageous is,
  that the size of the riblets 1 can be varied by a simple variation of the angle α at the partial beams 6, 7
  that the groove depth d of the riblets can be adjusted by the intensity and the advance speed,
  that riblets 1 with particularly steep flanks 11, slim pointed ribs 12 can be generated particularly simple by the slight overlap of in particular essentially identical interference structures, preferably generated by offset optic heads,
  that the processing is particularly contact-free and/or wear-free, i.e. long service lifes are made possible,
  that particularly little dust and/or vapours occur which can generally be quantitatively determined,
  that the processing can take place fully automatic and/or remotely controlled,
  that a scalability is possible by the use of a $CO_2$ continuous wave laser up to area yield of several square meters per minute, and/or
  that in the operation of the $CO_2$ continuous wave laser at a wavelength of 9.6 μm regularly particularly durable and weather-resistant polyurethane paints can be processed particularly rapidly and with high quality.

In an advantageous embodiment, the riblets are applied subsequently in standard cured paintings. This allows a particularly flexible application of the riblets.

In an advantageous embodiment, the riblet structures are generated by interfering laser radiation or interference patterning. In this way, riblets can be applied with a particularly high processing speed.

In an advantageous embodiment, interference structures of the interfering laser radiation or of the interference patterning are generated in particular slightly offset. Particularly pointed and sharp riblet tips can thereby be generated by superposition of in particular slightly offset interference structures.

In an advantageous embodiment, a $CO_2$ laser is used. Usual paint systems and in particular advantageous riblet sizes can be generated in this way very precisely and effectively.

In an advantageous embodiment, a laser with a wavelength of 9.6 μm is used. A particularly high absorption in PUR paint can thus be enabled.

As already explained above, the flow resistance at a component in operation can be improved reduced in total by adapting at different portions of the component the applied riblets 1 to the fluid conditions being present there in operation, i.e. flow velocity and/or air pressure. In a wind turbine generator in which the flow velocity at a rotor blade increases with increasing distance to the hub, the distance L of the intensity maxima $I_{max}$ of an in particular periodic distribution of the laser intensity I(x) over a transverse axis x perpendicular to the advance direction 9 or the longitudinal direction 8 of the riblets on the surface 3 adjusted accordingly by a free and continuously settable angle α.

The wall friction of a flow can in this way notably all in all be reduced. In an aircraft, for example the fuel consumption can be reduced or in a wind turbine generator its efficiency can be increased. An adaption of at least one geometrical parameter of the riblets 1—such as the size of the riblets, the groove width being correlated to the distance L, or the groove distance a—to the local flow conditions during operation of a component is therefore of particular advantage.

In an aircraft it is therefore due to the local different flow conditions during operation of advantage to adapt one or more geometrical parameters of the riblets 1 to the typical, local flow course along the aircraft at the upper side and lower side of the hull and/or along the wing or the tail assembly. During operation of a wind turbine generator or, respectively, a WTG the air pressure and the rotational speed of the rotor are almost constant wherein the tangential flow velocity over the rotor blade increases linearly with the distance to the rotor hub. Here it is particularly advantageous in applying the riblets 1 to let the riblets continuously more fine from the hub to the tip. In addition, the optimum riblet structures for the front and the back side of the rotor are different.

In order to be enabled to exploit the potential of the riblets in relation to the reduction of the flow resistance in an improved way it is therefore in an advantageous embodiment provided to generate for a component a riblet structure which is adapted to the local flow conditions being present during operation. With pre-embossed adhesive films or stems this is not possible or possible only with a non-economical effort.

In a preferred embodiment, it is provided that for during the riblet generation, in particular during the application of the riblets 1 into the surface 3, a combination angle θ between the two interfering partial beams 6, 7 is specifically modified.

The combination angle θ describes the angle enclosed by the two interfering partial beams 6, 7 during the reunion of the partial beams, or worded differently, during crossing or striking each other of the partial beams. In the following, the location of the reunion, the crossing or the mutual striking of the partial beams is referred to as "cross point". The "processing distance" refers in the following to the distance of the cross point of at least two partial beams from the processing head or a tilting axis 27 of a determined deflection mirror 24.

In particular, the cross point will be set onto the surface 3. The combination angle θ between the two interfering partial beams 6, 7 can then be measured when impinging on the surface 3. In an impingement of the two interfering partial beams 6, 7 which is symmetrical about the middle axis 26, there is θ=2α, wherein α is the angle which is enclosed by the middle axis 26 and the first or the second partial beam 6, 7. The combination angle θ can be an interference angle or can be referred to as interference angle.

A specific modification of the combination angle θ means a planned modification in order to obtain the desired combination angle θ. The specific modification is performed in particular semi-automatically by inclusion of the user or fully automatically by means of a control. The two interfering partial beams 6, 7 were obtained as described above by splitting of a coherent laser beam 15. The interfering partial beams 6, 7 form an interfering laser radiation 16 and/or bring a correspondingly distributed energy into the surface 3 in order to produce the riblets 1 by material removal.

The specific modification of the combination angle θ enables the specific adaption of at least one geometrical parameter of the riblets 1 which are applied into the surface 3 with the specifically modified combination angle θ. In particular, the geometrical parameters of the riblets 1 which can be adapted by the specific modification of the combination angle θ include inter alia the groove distance a, the groove width and the ratio of the groove depth d to the groove width a.

In an embodiment, by the specific modification of the combination angle θ the groove distance a, the groove width and/or the ratio of the groove width d to groove distance a of the riblets 1 can be specifically modified.

According to an embodiment, by the specific modification of the combination angle θ, the groove distance a, the groove width and/or the ratio of groove depth d over groove distance a of the riblets 1 can be adapted to the flow conditions which typically present an operation at the part of the surface 3 to be processed. With the part to be processed, a locally defined part of the surface is meant. Already during the specific modification of the combination angle θ or as soon as the processing head moves in the advance direction 9 or, respectively, continues its advance movement, the application of the riblets in this part to be processed takes place. For the flow conditions, the flow velocity and/or the air pressure can be taken into account. The flow conditions that are typically present during operation can be determined by measurements, calculations and/or estimations. Preferably, for the flow conditions typically present a mean value or a weighted average value is used.

In an embodiment there is provided a control in which depending on the position of the part of the surface 3 or the position of a processing point 29, a combination angle is deposited so that during the movement of the processing head over the surface 3 automatically by means of the control a combination angle is set which is provided for the currently processed part of the surface 3 or the actual processing point 29. In particular, a path sensor is provided so that the control obtains an information about the current position of the processing head or the processing point 29 relative to the surface 3. In particular, the control is capable to control a drive unit for motorized tilting of a tiltable deflection mirror 24 in order to modify or set the combination angle θ.

According to an embodiment, the combination angle θ is increased if for a part to be processed of the surface 3, a smaller groove distance a is to be provided regularly for the riblets 1 to be generated in this region due to a larger flow velocity expected there during operation.

According to an embodiment, the combination angle θ is reduced if for a region to be processed of the surface 3 a larger groove distance a is to be provided regularly for the riblets 1 to be generated in this region due to a smaller flow velocity expected there during operation.

In each location of a component such as a wing or a rotor blade, the riblets 1 may be adapted according to this particularly efficient and economical manner to the flow conditions prevailing during operation in this location in order to maximize the resistance reduction.

According to an embodiment, the processing head is adapted so that a laser beam 15 incoming into the processing head from a laser is split into several partial beams 6, 7 and brought together again subsequently for the formation of the interfering interference radiation 16 with a desired interference structure. In an analogous way, this can also be implemented for the additional laser beam 17. Thus, the riblets can be generated with a particularly easily handleable, monolithic processing head. For the splitting of the laser beam 15 or the additional laser beam 17 into partial beams 6, 7, the beam splitting device or a beam splitter may be employed. For the bringing together of the partial beams 6, 7, deflection mirrors 23, tiltable deflection mirrors 24 and/or an optical deflection body 30 may be used.

In an embodiment, the beam splitter is a diffractive optical element (DOE) or the beam splitting device comprises a DOE. A laser beam 15 or additional laser beam 17 can thereby almost without energy loss be split into two or more partial beams 6, 7, preferably in exactly two or exactly four partial beams 6, 7. By interference effects within the DOEs, an incoming laser beam is split into two, three, four or more partial beams 6, 7. The two, three, four or more partial beams 6, 7 are deflected under a particular angle. In an embodiment, the DOE is a transmissive DOE. The partial beams 6, 7 are then transmitted through the DOE. Alternatively, the DOE is a reflecting DOE. The partial beams 6, 7 are then reflected by the DOE.

Preferably, the DOE is a reflecting or transparent phase grating 25. A particularly compact assembly of the processing head can thereby be realized. A reflecting phase grating 25 is particularly robust and has a comparatively high destruction threshold. A transparent phase grating 25 enables a particularly slim assembly of the processing head. With a phase grating 25, the monochromatic laser beam 15 can be split into different partial beams 6, 7 wherein the lattice constant determines the deflection angle of the partial beams 6, 7 immediately behind the phase grating 25, while the intensity of the partial beams 6, 7 can be adapted to the number and geometry of the riblets by a respective setting of the power of the laser. The reflecting and the transparent phase grating can according to an embodiment be adapted, in particular by a corresponding choice of the lattice parameter, that the incoming laser beam can be split into two, three, four or more identical partial beams 6, 7. In particular, the identical partial beams are deflected symmetrically with respect to the original beam direction of the laser beam 15, Preferably, the original beam direction of the laser beam 15, along which the laser beam 15 impinges onto the reflecting or transparent phase grating, runs along the middle axis 26. In an analogous way according to an embodiment a reflecting or transparent phase grating is used for the additional laser beam 17.

In an alternative or supplemental embodiment, the beam splitter is a partially reflecting mirror or the beam splitting device comprises a partially reflecting mirror. The incoming laser beam 15 is then partially transmitted and partially reflected.

According to an embodiment, for the specific modification of the combination angle θ, at least one tiltable deflection mirror 24 is tilted for deflection of a partial beam 6, 7. A particularly simple and reliable specific modification of the combination angle θ is thus be enabled.

In an embodiment, for the specific modification of the combination angle θ, two or four tiltable deflection mirrors 24 are tilted for deflecting a partial beam 6, 7. In particular, only one tiltable deflection mirror 24 is provided each for exactly one partial beam 6, 7. Alternatively or supplementary, a tiltable deflection mirror 24 can be shaped or configured such that two partial beams 6, 7 can be regularly deflected. In an alternative or supplemental embodiment, all tiltable deflection mirrors 24 are tiltable only synchronously. In particular, two or four only synchronously tiltable deflection mirrors 24 are provided for specific modification of the combination angle θ. During a tilt, a change of the tilt angle of the deflection mirror 24 occurs about a tilt angle change d.

The periodic distance L of the riblets 1 between two neighbouring intensity maxima $I_{max}$ is determined by the combination angle θ of the partial beams 6, 7. By in particular synchronous change of the tilt angle of the tiltable deflection mirror 24 about a tilt angle change δ, the angle θ and hence the distance L can be specifically modified. In particular, a tilt of a deflection mirror 24 occurs about a tilt axis 27. Preferably, the tilt axis 27 is oriented perpendicular to the middle axis 26.

Preferably, the two or four tiltable deflection mirrors 24 are positioned symmetrically about a middle axis 26. A mirror pair or respectively two mirror pairs of each two symmetrically arranged tiltable deflection mirrors 24 are thus obtained. Only synchronously tiltable means that tilt movements of the only synchronously tiltable deflection mirrors 24 are in a well-defined ratio with respect to each other or exhibit the same tilt angle change. For the application of riblets with modified geometry, the synchronously tiltable deflection mirrors 24 are synchronously correspondingly tilted, preferably all two or four tiltable deflection mirrors 24 about the same absolute value of the tilt angle change δ. If exactly two tiltable deflection mirrors 24 are provided for, the two tiltable deflection mirrors 24 of each mirror pair are preferably tilted about the same tilt angle in order to specifically modify the combination angle θ. Generally, a tilt of the tiltable deflection mirrors 24 of a mirror pair takes place mirror-symmetrically to the middle axis 26.

In an embodiment, the two tiltable deflection mirrors 24 are cardanic tiltable deflection mirrors 24. Since a cardanic tiltable deflection mirror can be tilted with the mirror surface about the point of impingement of the incoming beam, e.g. laser beam or partial beam, it is enabled that the pivot point of the beam stays always the same.

In an embodiment, a driving mechanism for motorized tilt of the two tiltable deflection mirrors 24 is provided in particular for a tilt in one or more differently oriented tilt axes. A high level of automatization can thus be achieved.

In an embodiment, at least two partial beams, in particular exactly two or exactly four partial beams 6, 7, may be deflected by each one tiltable deflection mirror 24 directly onto the surface 3 for applying the riblets 1 or onto an optical deflection body 30. A particularly simple assembly of the processing head can thus be achieved.

In an embodiment, the at least one tiltable deflection mirror 24 directs a partial beam 6, 7 onto the surface 3. In particular, the directing, i.e. the deflection, of the one partial beam takes place directly from a tiltable deflection mirror 24 onto the surface. A particularly simple assembly of the processing head can thus be achieved.

According to an embodiment, the processing head or the arrangement of the optical elements is adapted so that by the tilt of the tiltable deflection mirror 24, the processing distance can be modified. The distance of the processing head or a tilt axis 27 of a determined deflection mirror 24 from the cross point of two interfering partial beams 6, 7, which strike each other under the combination angle θ changes then with a tilt of a tiltable deflection mirror 24.

In particular, a tracking of the processing head is provided in order to compensate a change of the processing distance due to the specific modification of the combination angle θ. In this way it is ensured that the cross point of the partial beams 6, 7 lies approximately at the level of the surface 3 and/or in the desired processing point 29. Preferably, the focusing device is set and/or tracked so that the focus positions of the partial beams 6, 7 lie approximately at the level of the surface 3 and/or in the desired processing point 29. The focus level describes, with respect to the beam propagation direction, the position of the smallest spot diameter in the beam path relative to the processing point 29 on the surface 3 to be processed. By a change of the processing distance and/or the focus position, the spot diameter or respectively the laser spot 36 (see FIG. 10) on the surface 3 to be processed is affected. Hereby in turn, the intensity of the interfering laser radiation 16 acting on the point to be processed 29 will change which may generally affect e.g. the groove depth d or the groove width.

In an alternative embodiment, in which the processing distance changes by the tilting of the tiltable deflection mirror 24, a tracking of the processing head is not provided for in order to specifically modify, by a processing distance changed in that way, the groove depth d and/or the groove width of the riblets.

In an embodiment, the tiltable deflection mirrors 24 each direct a partial beam 6, 7 on an optical deflection body 30 for deflection onto the surface 3. By the use of an optical deflection body 30 in the beam path between the tiltable deflection mirrors 24 and the surface 3 to be processed, a particular compact assembly of the processing head can be achieved and the number of optical components can be reduced. In particular, by the optical deflection body 30 it can be achieved that the processing distance, during a specific modification of the combination angle θ in particular by tilting of a tiltable deflection mirror 24, remains constant.

In an embodiment, the optical deflection body 30 comprises, for deflecting of a partial beam 6, 7, a two-dimensionally curved or three-dimensionally curved deflection area 31. In an embodiment, the two-dimensionally or three-dimensionally curved surface is ellipsoidally curved. Thus, it can be achieved that the processing distance, during a specific modification of the combination angle θ in particular by tilting of a tiltable deflection mirror 24, remains constant.

In an embodiment, the optical deflection body 30 and/or the deflection area 31 for a partial beam 6, 7 are reflecting, i.e. not transparent. Preferably, the optical deflection body 30 and/or the deflection area 31 are made of metal, preferably of copper.

In an embodiment, the optical deflection body 30 for deflection of a partial beam 6, 7 comprises a two-dimensionally curved deflection area 31 for specifically modifying the combination angle θ dependent on a tilt angle change δ of the tiltable deflection mirror 24. In particular, herein the processing distance is independent of the tilt angle change δ.

By the provision of a deflection area 31, two-dimensionally curved in such a way, an unchanging processing distance can be maintained also during the tilting of a tiltable deflection mirror 24 about a tilt angle change δ for specifically modifying the combination angle θ. A tracking of the processing head can therefore be omitted. If the processing head is, for example by means of rolls in a constant distance to the surface 3, moved in advance direction, the combination angle θ can therein, without distance adaption, specifically, continuously, fast and reliably be changed.

In an embodiment, the two-dimensionally curved deflection area 31 extends in a tilt plane of the tiltable deflection mirror 24, i.e. perpendicular to the tilt axis 27.

In an embodiment, the two-dimensionally curved deflection area 31 has an ellipsoidal contour course which corresponds to a portion of an ellipse 32. In an embodiment, this ellipse 32 has a first focal point in the tilt axis 27 of a tiltable deflection mirror 24. In an embodiment, this ellipse 32 has a second focal point in a cross point of the partial beams and/or in a processing point 29 on the surface 3 to be processed. With a change of the combination angle θ particularly reliable an unchanged processing distance is enabled.

Preferably, a lens 33 for focusing is provided in the beam path before the beam splitter or, respectively, the beam splitting device so that by the optical deflection body 10 only a deflection without focusing takes place.

In an embodiment, the optical deflection body 30 for deflecting a partial beam 6, 7 comprises a three-dimensionally curved deflection area 31 for focusing the partial beam 6, 7 on the surface 3 and/or for specifically modifying the combination angle θ dependent on a tilt angle change δ of the tiltable deflection mirror 24. In particular, herein the processing distance is independent of the tilt angle change δ. In particular, the three-dimensionally curved deflection area 31 comprises an ellipsoidal, preferably parabolic or spherical curvature.

In an embodiment, the three-dimensionally curved deflection area 31 corresponds to two two-dimensional curvatures overlaying each other wherein the planes of the two two-dimensional curvatures are oriented perpendicular with respect to each other.

In particular, the first two-dimensional curvature extends in a plane perpendicular to the tilt axis 27 and/or corresponds to the above-described two-dimensional curvatures for specifically modifying the combination angle θ dependent on a tilt angle change δ of the tiltable deflection mirror 24. Preferably, the first two-dimensional curvature comprises the above-described first focal point and/or second focal point of the ellipse 32.

In particular, the second two-dimensional curvature extends in a plane perpendicular to the middle axis 26 and/or has a preferably parabolic contour course or a contour course of the shape of a segment of a circle for focusing an incoming partial beam onto the cross point with another partial beam and/or onto the processing point 29 on the surface 3 to be processed.

In an embodiment, the three-dimensionally curved deflection area 31 comprises in a first plane perpendicular to the tilt axis 27 of the tiltable deflection mirror 24 an ellipsoidal curvature as well as perpendicular therewith a parabolic or spherical curvature. The wording "perpendicular therewith" in this case specifically means perpendicular to the first plane and along the area normal in each point. The parabolic or spherical curvature of the three-dimensionally curved deflection area 31 serves the focusing of a partial beam 6, 7 on the surface 3. The ellipsoidal curvature corresponds in particular to the above-described first two-dimensional curvature.

A parabolic curvature has the advantage that this curvature can focus the partial beam 6, 7 about only one axis. A pre-focusing or a focus lens 33 for focusing the laser beam 15, which is comprised by the processing head and is in the beam path located before the optical deflection body 30, can be omitted in this way and the number of optical components can be reduced. Further, due to the higher proximity to the surface, focusing may be improved. A spherical curvature has the advantage that a particularly precise focusing can be implemented particularly simple and reliable.

The partial beam 6, 7 directed to the deflection area 31 by the tiltable deflection mirror 24 can thereby be focused on the surface 3 with a specifically adjustable and modifiable combination angle θ, wherein the combination angle θ is dependent on the tilt angle of the tiltable deflection mirror 24.

In particular, the optical deflection body 30 with a three-dimensionally curved deflection area 31 belongs to the focusing device 20 or in an embodiment is the focusing device 20.

In an embodiment, the focusing device 20 and/or the optical deflection body 30 are configured such that the laser beam 15 with an essentially circular beam cross-section 34 is focused such that the interfering laser radiation 16 comprises an elongated radiation cross-section 35. In the processing point 29 on the surface 3 to be processed thereby acts an interfering laser radiation 16 with an elongated radiation cross-section 35 for applying the riblets 1. Worded differently, an elongated surface piece is simultaneously exposed by the interfering laser radiation 16. It arises a so-called laser spot 36, which is elongated. The laser spot 36 therefore has a long side in direction of this elongated extent as well as a short side which extends perpendicular to the long side. A length of the laser spot 36—in the following also referred to as "spot length"—of the long side and a width of the laser spot 36—in the following also referred to as "spot width"—of the short side can be measured. The width of the laser spot 36, i.e. its short side, extends in the longitudinal direction 8.

In particular, the elongated radiation cross-section 35 is oval or essentially rectangularly shaped.

In an embodiment, the elongated radiation cross-section 35 has in the focus position an aspect ratio of length to width of at least 5 to 1, preferably 20 to 1 and/or at most 500 to 1, preferably 200 to 1, particularly preferably about 50 to 1. For example, the laser spot 36 is on the surface 3 in the focus position 5 cm long and 1 mm wide.

According to an embodiment, the elongated extent of the radiation cross-section 35 is oriented transverse to the longitudinal direction 8 of the riblets 1 or, respectively, the grooves 13.

Preferably, the advance direction 9 is directed transverse to the direction of the elongated extent of the radiation cross-section 35. In this way, by moving the processing head over the surface 3 in advance direction 9 which corresponds to the longitudinal direction 9 of the grooves 13, several grooves 13 side by side and hence a plurality of parallel riblets 1 can continuously be applied into the surface 3.

Thus, a component can be produced the surface 3 of which comprises riblets 1 with a groove distance a which continuously changes in the longitudinal direction 8 and indeed dependent on the flow conditions typically predominant at the respective position during operation.

According to an embodiment, at least ten, preferably fifty, particularly preferably one hundred and/or at most five thousand, preferably at most one thousand, particularly preferably at most five hundred parallel grooves 13 or riblets 1 are applied simultaneously by the interference structure focused on the surface 3 to be processed. In a further development of this embodiment, the number of the parallel grooves 13 or riblets 1 which are simultaneously applied by the interference structure focused on the surface 3 to be processed are adapted to the size of the laser spot 36, in particular to its length. The length of the laser spot 36 is measured, as described above, perpendicular to the longitudinal direction 8, in which the processing head is moved over the surface 3. In particular, per mm spot length at least five grooves 13 and/or at most 20 grooves 13 are provided. With a slim spot width of 1 mm and an aspect ratio in an exemplary range of 1:10 to 1:200 this can correspond to spot length of ten to two hundred mm and hence to 50 to 4000 grooves 13 which are simultaneously applied into the surface 3.

According to an embodiment, the focusing takes place about only one axis so that a laser beam 15, in which the length of the beam cross-section 34 corresponds approximately to the width is transformed into an elongated radiation cross-section 35.

In particular, the focusing about only one axis takes place by one or more lenses of the focusing device before or after the beam splitting or by the optical deflection body 30.

According to an embodiment, the curved deflection area 31 is shaped such that a partial beam 6, 7 which falls onto the curved deflection area 31 with an essentially circular beam cross-section 34 is deflected and/or focused onto the surface to be processed with an elongated radiation cross-section 35. In particular, the long axis of the laser spot 36 extends along the plane of the partial beam 6, 7 incident on the surface 3 to be processed.

A constant processing distance in case of a changing combination angle θ can in this way be enabled also without tracking the processing head by the optical deflection body 30. Further, by a deflection body 30 with a three-dimensionally curved deflection area 31, smaller focal lengths and hence an increased focusing with a smaller spot diameter in the focus position can be made possible. The smaller focal length is possible because the optical deflection body 30 compared to a lens 33 can be, for focusing before the tiltable deflection mirrors 24, positioned closer to the surface 3. With a lens 33 for focusing with a similar small focal length, there would be namely otherwise hardly or no space between the beam splitter and the surface 3 for accommodating the optical deflection body 30.

In an embodiment, the optical deflection body 30 is symmetrically shaped and/or constructed, in particular with regard to the middle axis 26 and/or to the tilt axis 27. Preferably, a plane which is defined by the middle axis 26 and the tilt axis 27 serves as symmetry plane for the optical deflection body 30. Preferably, two opposing curved deflection areas 31 are provided and/or mirror-symmetrically with respect to the symmetry plane.

In an embodiment, the optical deflection body 30 pivotably runs on bearings, in particular about a pivot axis 28. The partial beam 6, 7 can in this way be deflected in direction of the advance direction 9 or opposite to the advance direction 9. Thereby, the processing point 29 on the surface 3 of the component can be moved relative to the processing head. This may be for example helpful to compensate inaccuracies of the advance movement. In particular, the pivot axis 28 extends perpendicular to the middle axis 26 and/or perpendicular tilt axis 27. Preferably, two tiltable deflection mirrors 24 comprise a same distance from the optical deflection body 30 in direction of the pivot axis 28.

A further aspect of the invention relates to a method for producing riblets 1 wherein the riblets 1 are applied by means of laser interference patterning or DLIP—Direct Laser Interference Patterning—in a surface 3, in particular in a painted and cured surface 3 wherein by aid of two interfering partial beams 6, 7 on the surface 3, which is in particular painted and cured, an interference structure with intensity maxima $I_{max}$ in a periodic distance L is generated, wherein during the riblet production, in particular during the application of the riblets into the surface 3, a combination angle θ between the two interfering partial beams 6, 7 is specifically modified. Riblets 1 thus can be adapted to the flow conditions prevailing in operation and can be particularly efficiently produced. The above description relates also to this aspect of the invention.

A further aspect of the invention relates to a device for applying riblets 1 by means of laser interference patterning or DLIP—Direct Laser Interference Patterning—in a surface 3 of a component, in particular in a painted and cured surface 3, comprising a laser, a processing head with a beam splitting device 21 and a focusing device 20 as well as a movement unit 14, wherein the movement unit 14 is configured such that the processing head—in particular controlled by a control and/or driven by a drive mechanism—can be moved over a surface 3 to be processed, wherein the processing head is configured such that by aid of two interfering partial beams 6, 7 on the surface 3, which is in particular painted and cured, an interference structure with intensity maxima $I_{max}$ in a periodic distance L can be generated, wherein the device is configured so that during the riblet production, in particular during the applying of the riblets 1 into the surface 3, a combination angle θ between the two interfering partial beams 6, 7 can be specifically modified. By this device, riblets 1 can be particularly economically generated on large areas in a way that the geometry of the riblets is adapted to the local different flow conditions during operation.

A further aspect of the invention relates to a component which in particular was produced in the above-described manner, wherein a surface 3 of the component comprises riblets 1, wherein the riblets 1 and the grooves 13 between the riblets extend continuously, i.e. without interruption, in a longitudinal direction 8, wherein a groove distance a between two immediately neighbouring grooves 13 changes in the longitudinal direction 8, in particular continuously. In a continuous change of the groove distance a of a riblet structure extending continuously in longitudinal direction 8, the riblets 1 run continuously and/or curved in sections, however not interrupted or fitted together from several pre-produced pieces. A particularly effective reduction of the friction resistance due to flows prevailing during operation can thus be enabled. The above description relates also to this aspect of the invention.

FIG. 7 shows a symmetrical assembly in which the partial beams 6, 7 each impinge on a tiltable deflection mirror 24. These tiltable deflection mirrors 24 bring the partial beams 6, 7 on the surface 3 to the overlap. In this way, the interference structure forms there which, by means of laser beam machining in particular in the paint of the surface 3, generates the riblet structure and thereby the riblets 1. For the example of a wind turbine generator (WTG), the design and the function of the device shall be described exemplarily.

In a wind turbine generator, the circumferential speed of the rotor tips is in a range of 100 m/s. Wind channel investigations have shown that for these speeds the riblets 1 exhibit preferably approximately the distance a=60 μm for particularly effectively reducing the flow resistance. Approximately 75% of the yield of the WTG provided by an area swapped by the outer half of the rotor radius. Within this region, the circumferential speed drops to the half compared to the rotor tip. Accordingly it is preferably provided to double the periodic distance L. This means in the region relevant for the yield, the size of the riblets should continuously increase from 60 μm to 120 μm. For the part close to the hub of the rotor, even larger riblet structures are preferable. These riblets can generally be generated according to the above-described method.

FIG. 8 shows an extension of the assembly shown in FIG. 7. An in-phase superposition of interference structures with the periodic distances L and L/2 is enabled with this assembly. Like in the assembly of FIG. 7, a transparent phase grating 33 is employed in which however, not like in FIG. 7 two symmetrical partial beams 6, 7, but rather two symmetrical pairs of each two partial beams 6, 7 occur, i.e. four partial beams. The tilt angles of the tiltable deflection mirrors 24 are now adjusted such that for the one pair the combination angle θ for the periodic distance L results and for the other pair the combination angle θ for the periodic distance L/2 results.

From the relationship L=λ/2 sin α and the wavelength of the laser λ=9.4 μm follows that the half combination angle has to be changed in the region of $\alpha_{60}$=4.4° to $\alpha_{120}$=2.2° in order to cover the relevant rotor region. The two symmetrical deflection mirrors (see FIG. 7) are to this end preferably re-adjusted each by the half of the difference Δα=(4.4°-2.2°)= 2.2°, i.e. about 1.1°. Simultaneously, the processing head is preferably correspondingly tracked relative to the surface 3, i.e. moved. In an embodiment, these fine adjustments are realized online by aid of electromechanical or by piezoelectric actuators. In this way, at the WTG rotor or, respectively, at the aircraft component with the periodic distance L, local riblet structures with corresponding groove distance a can be generated.

FIG. 9 shows an optical assembly in which the partial beams 6, 7 each are directed by a tiltable deflection mirror 24 respectively onto a curved deflection area 31 and from there deflected to the surface 3. In particular, the curved deflection area 31 of the assembly of FIG. 9 is two-dimensionally curved. A lens 33 is provided for focusing of the laser radiation onto the surface 3. The focusing by the lens 33 occurs about only one axis so that in the processing point 29 an elongatedly shaped radiation cross-section develops which can produce a laser spot 36 as shown in FIG. 10.

FIG. 11 shows an optical deflection body 30 in a spatial side view. The curved deflection area 31 has in a front plane the same curvature as shown in FIG. 9.

The deflection area of FIG. 11 is however at least in one further plane spherically or parabolically curved, as indicated in FIG. 11. In this way by means of the optical deflection body 30 it can be focused at the same time. Hence, a double function is assigned to the optical deflection body 30 with an in such a manner three-dimensionally formed deflection area 31. A lens 33 for focusing can thereby be omitted.

In the assemblies shown in FIGS. 7, 8, 9 and 11, the combination angle θ, depending on a synchronous tilt angle change δ of the tiltable deflection mirrors 24, can be specifically modified and therewith the riblet size, in particular the groove distance a can be adapted during the processing process continuously to target value determined in advance.

FIG. 10 shows an elongated laser spot which maps the intensity distribution of the interfering laser radiation. The laser spot can be determined by burning in into an underlayment, e.g. at the height of the surface 3 or by a device for position resolved acquisition of the intensity distribution of laser radiation or the interfering laser radiation. By determining the distance between two intensity maxima $I_{max}$ further the distance L can be determined therefrom. In an embodiment, the laser spot 36 on the surface has a spot width of at least 0.3 mm and/or at most 3 mm, preferably about 1 mm. In the assemblies shown in FIGS. 7, 8, 9 and 10, preferably a focusing of the originally circular beam cross-section 34 is provided for obtaining an elongatedly shaped radiation cross-section 35 in the processing point 29 which may effect a laser spot 36 as exemplarily shown in FIG. 10. Several riblets 1 side by side can in this way be generated by moving the interfering laser radiation in the advance direction 9 over the surface 3.

The riblet production relates to the entire production process. The processing head is at first adjusted such that riblets with the desired geometry can be generated. For modifying the riblet geometry, in the course of the riblet production, an adaption of the processing head takes place continuously during the application of the riblets. In principle it is possible to stop the processing head for the adaption and to decouple the laser at this time. However, since in this way processing time would be lost, the continuous adaption of the settings to the desired riblet geometry is preferably provided for.

With the method according to the initially described aspect of the invention, the riblets are applied into a surface, in particular into a painted and cured surface by means of laser interference patterning or DLIP. In particular, thereby the riblets are applied into a paint layer 4, 5 coated onto the surface and being cured. The surface is generally a surface of a component. If a surface has been painted, the surface has at least one paint layer 4, 5 of a paint system. A paint system can be a paint with several ingredients or components. Preferably, for several paint layer 4, 5 of the surface, e.g. top paint layer 4 and base paint layer 5, different paint systems are provided for. A painted and cured surface 3 is a painted surface of a component the paint system of which is cured or, respectively, the paint systems of which are cured. The riblets are therefore applied into not until the curing of a paint or, respectively, a paint system.

In an embodiment, the paint system of the surface 3 is based on polyurethane, epoxy and/or acrylic components and/or the surface of a component was painted with a paint system which is based on polyurethane, epoxy and/or acrylic components. In particular, the paint system serves in this embodiment for the formation of a top paint layer 4. The paint system of this embodiment refers to the painted and cured surface, i.e. it can be used for the painting of the surface with subsequent curing.

In an embodiment, the laser possesses a sufficiently spatial and temporal coherence so that its beam can be split into identical partial beams 6, 7 which in a subsequent superposition generate regular interference structures. A laser which possesses a sufficient spatial and temporal coherence denotes a laser beam source which can generate a beam with sufficient spatial and temporal coherence. By beam here the laser beam 15 and/or the additional laser beam 17 are meant. The interference structures correspond to the interfering laser radiation 16 and/or the additional interfering laser radiation 18.

In an embodiment, the laser is continuously excited and/or operated in continuous wave or pulsed with pulsed durations smaller than 1 ms. Soot formation can thus be avoided, in particular in the use of a $CO_2$ laser and/or in applying the riblets into a paint layer. In an embodiment, the pulse duration is >0.1 μs, preferably >1 μs. A foam-up of the material can thus be reduced, suppressed and/or entirely inhibited, in particular in the use of a $CO_2$ laser and/or in applying the riblets into a paint layer. A laser operated in continuous wave is generally a continuous wave laser 2, i.e. a continuously excited laser which in contrast to a pulse laser emits a laser beam uninterruptedly. It is in principle possible that the continuous wave laser 2 is configured such that a pulsed laser beam is emitted.

In an embodiment, the laser is a $CO_2$ laser the emission of which is in particular, depending on the paint system, configured on the wavelength 9.3 μm, 9.4 μm, 9.6 μm or 10.6 μm. With emission the laser beam 15 and/or the additional laser beam 17 are meant. A configuration of the laser or, respectively its emission depending on the paint system takes place according to a corresponding absorption characteristic of the paint system in such a way that of several possible wavelengths for the emission exactly the one wavelength for the configuration is selected which comes closest to a peak wavelength or a wavelength region with relatively high absorption according to the wavelength dependent absorption characteristic of the paint system.

In an embodiment, the riblets 1 are produced with the aid of interfering laser radiation 16, 18, i.e. the interfering laser radiation 16 and/or the additional interfering laser radiation 18.

In an embodiment, by aid of two interfering partial beams 6, 7 on the paint surface, an interference structure is generated with intensity maxima $I_{max}$ in the periodic distance L. The interference structure corresponds to the interfering laser radiation 16 and/or the additional interfering laser radiation 18.

In an embodiment, by lateral movement of the interference structure with simultaneous laser removal (laser machining), parallel grooves 13 on the paint surface and thus riblets 1 in flow direction arise. The thus obtained grooves 13 form a groove system. Generally, two neighbouring grooves have a groove distance a which is normally measured from groove center to groove center of the two neighbouring grooves, in particular transverse to the longitudinal direction 8. Lateral movement means the advance movement, in particular in the advance direction 9 and/or in the longitudinal direction 8 of the grooves 13. The flow direction is in general parallel oriented with respect to the longitudinal direction 8 of the grooves 13. The paint surface means an already painted and cured surface 3.

In an embodiment, the riblets 1 are applied into the outer top paint layer 4 wherein a base paint layer 5 positioned below the top paint layer 4 exhibits a comparatively small absorption for the respective laser wavelength. Preferably, the absorption level of the base paint layer 5 is smaller than the absorption level of the top paint layer 4 for the wavelength of the laser beam 15 or, respectively, of the additional laser beam 17.

In an embodiment, the base paint layer 5 positioned below the top paint layer 4 is partially exposed by means of the interfering laser radiation 16, 18.

In an embodiment, for the generation of steep flanks 11 at the riblet structures, i.e. the flanks 11 of the riblets 1, the original laser beam 15 is split into at least three or four partial beams 6, 7, preferably identical partial beams 6, 7 and these partial beams 6, 7, preferably identical partial beams 6, 7 are in turn, for the generation of interference structures, a first interference structure and a second interference structure, brought to an overlap on the paint surface. In an embodiment, for the splitting of the original laser beam into partial beams, a phase grating 25 is provided. In an embodiment, the first interference structure and the second interference structure are separated. Preferably, the two interference structures are separated such that no interference of the two interference structures occurs. For example, the two interference structures are directed locally offset onto the surface 3 to be processed.

In an embodiment, each two of the four partial beams generate an interference structure in two separated optical units and/or the thus generated separated groove systems will be or can be offset with respect to each other. In particular, the interference structure is generated by aid of two interfering partial beams 6, 7 on the paint surface with intensity maxima $I_{max}$ in periodic distance L. Preferably, the groove systems arise as by the lateral movement of the interference structure with simultaneous laser machining parallel grooves on the paint surface and thereby riblets in flow direction are generated.

Generally, the distance L between two intensity maxima $I_{max}$ can be determined by aid of a device for measuring the radiation intensity.

In an embodiment, the distance period, i.e. the distance a of the two groove systems is each 2L and the two groove systems are displaced transverse to the groove 13, i.e. transverse to the longitudinal direction 8, by a distance L so that therefrom, by the superposition of the interference structures, a riblet structure with the period L and/or with particularly steeper flanks as in the case of two beam interference results. Meant with period L and distance L is a displacement with the amount of the distance L between the two neighbouring, distant intensity maxima $I_{max}$.

In an embodiment, the riblets 1 are applied into the surface 3 of an aircraft 10, a ship or the rotor blades of a wind turbine generator.

A further aspect of the invention relates to a device for solving the initially posed problem. The device is in particular adapted for the performance of the above-described method for generating of riblets 1. The device comprises a $CO_2$ laser configured for the production of the riblets 1. The device comprises further a monolithic processing head which may also be referred to as optic head. In the processing head, two or more beam splitters, in particular of the beam splitting device 21, are integrated. In the processing head are further integrated one or more fine adjustable, refracting and/or reflecting optical elements, in particular of the focusing device 20. The processing head further comprises a semi- or fully automatic manipulator. The manipulator is in particular a movement unit which is configured such that a laser beam 15, interfering laser radiation 16, an additional laser beam 17 and/or additional interfering laser radiation 18 can be moved relative to the surface 3. Preferably, the movement unit is a multi-axes axis robot 14 with several axes of movement.

In the production of riblets 1 with flat grooves 13, relatively steep flanks and bars which are as pointed as possible, it has to be considered that this structure has to withstand also the mechanical operating loads. In a two-beam interference, the intensity profile is sinusoidal, i.e. the transition from maxima to minima is relatively smooth. Initially one would expect this relatively smooth profile also for the riblets 1. The removal image on the paint of the surface 3 of the component is however more concise since the removal occurs by laser ablation. The laser ablation starts only at a certain intensity threshold and is, in particular with paint systems with layer assembly, not linear. The depth of the grooves 13 and the steepness of the flanks can be controlled to a certain extent by the intensity of the laser radiation and its impact time.

Moreover, it appeared that a further improvement of the riblet shapes can yet be generated if in addition to the two-beam interference picture with the period L, one superimposes in phase a second interference picture with the period L/2. If the intensity of the L/2 period is half the magnitude of the L period, the maxima in the distance L become steeper and the minima lying therebetween become more flat. The thus generated riblets 1 constitute a good compromise between the aerodynamic gain and mechanical loading capacity.

In the FIGS. 5 and 6 it is shown how the first intensity distribution $I_1(x)$ of the interfering laser radiation 16 and a, separated therefrom, second intensity distribution $I_2(x)$ of the additional interfering laser radiation 18 are displaced by a local offset $\Delta L$, in particular in direction transverse to the longitudinal direction 8 of the grooves 13 and/or transverse to the advance direction 9. The interfering laser radiation 16 can also be referred to as first interference structure. The additional interfering laser radiation 18 can also be referred to as second interference structure.

In an embodiment, the first interference structure is displaced with respect to the second interference structure by L/2. The local offset $\Delta L$ corresponds thus to the half periodic distance L. In particular, the first interference structure and the second interference structure have the same periodic distance L of the respective intensity maxima $I_{max}$. The non-processed flat surface regions can thereby, in particular centered between the grooves of the first processing step, thus by the first intensity distribution $I_1(x)$, be provided with grooves of the second processing step, thus by the second intensity distribution $I_2(x)$.

Riblets with a groove depth d which corresponds to approximately the half of the groove distance a can be in this way produced particularly simple and precisely.

FIG. 6 shows a two-step production process with providing of a material layer and an underlayer or, respectively, a top paint layer 4 and a base paint layer 5, wherein the intensity distributions $I_1(x)$ and $I_2(x)$ are adjusted such that the underlayer or, respectively, the base paint layer 5 is partially exposed.

The two-step production process is realizable in an embodiment by two processing heads which are directly coupled with each other but offset by an offset $\Delta L$, which each comprises at least one focusing device 20. In an alternative or a supplemental embodiment, the two-step production process is realizable by a processing head with one or two beam splitting devices 21 and at least two focusing devices 20. Generally, from one incoming laser beam 15 by beam splitting or several beam splittings, the interfering laser radiation and an additional interfering laser radiation 18 offset by the offset $\Delta L$, can be obtained.

In the FIGS. 5 and/or 6, the laser radiation of the first processing step is in particular the interfering laser radiation or a first interference structure which was preferably obtained by conversion of the laser beam 15. In the FIGS. 5 and/or 6, the additional laser radiation of the second processing step is in particular the additional interfering laser radiation 18 or a second interference structure which was preferably obtained by conversion of the laser beam 17.

The invention claimed is:

1. A method for producing riblets, the method comprising:
   applying the riblets into a surface by laser interference patterning by intensity dependent laser removal, wherein a laser used for the laser interference patterning is a $CO_2$ laser;
   wherein the surface is configured for being exposed to a flow;
   wherein by application of the riblets a flow resistance is reduced;
   wherein neighbouring riblets define a groove therebetween; and
   wherein the laser is operated in continuous wave or pulsed with a pulse duration larger than 0.1 microseconds.

2. The method according to claim 1,
   wherein the surface is formed from a paint system;
   wherein the paint system is based on at least one of polyurethane, epoxy, and acrylic components.

3. The method according to claim 1, further comprising:
   dividing a beam of the CO2 laser so as to form two partial beams;

overlapping the two partial beams on the surface, thereby allowing the two partial beams to interfere so as to generate an intensity distribution of radiation, the intensity distribution comprising intensity maxima in a periodic distance L.

4. The method according to claim 3, further comprising a lateral movement of the overlapping partial beams.

5. The method according to claim 1,
wherein the surface is formed by an outer top paint layer and wherein a base paint layer, positioned below the top paint layer, exhibits a lower absorption for the laser radiation of the $CO_2$ laser than the top paint layer; and
wherein the riblets are formed in the top paint layer.

6. The method according to claim 1, wherein for the generation of steep flanks at the riblets, an original laser beam is split into three or four partial beams and these in turn are brought to an overlap for the generation of interference structures on the surface.

7. The method according to claim 3, wherein a first interference structure is displaced with respect to a second interference structure by L/2.

8. The method according to claim 3, further comprising modifying, during the applying of the riblets, a combination angle θ between the two interfering partial beams.

9. The method according to claim 8, wherein modifying the combination angle includes modifying the combination angle by tilting at least one tiltable deflection mirror for deflecting a partial beam.

10. The method according to the claim 9, wherein the at least one tiltable deflection mirror directs the partial beam onto the surface or onto an optical deflection body for deflection onto the surface.

11. The method according to claim 10, wherein the optical deflection body for deflecting the partial beam comprises a deflection area for specifically modifying the combination angle θ dependent on a tilt angle change δ of the at least one tiltable deflection mirror, wherein the deflection area has a curved contour in a section plane.

12. The method according to claim 10, wherein the optical deflection body for deflecting the partial beam comprises a three-dimensionally curved deflection area for focusing the partial beam onto the surface.

13. A device comprising an optical assembly for generating from an incident beam of a CO2 laser at least two partial beams, the optical assembly directing the at least two partial beams onto a surface of a component for generating on the surface, by interference of the at least two partial beams, an intensity distribution, thereby applying riblets by laser interference patterning by intensity dependent laser removal into the surface of the component;
wherein the surface is configured for being exposed to a flow;
wherein by application of the riblets a flow resistance is reduced;
wherein neighbouring riblets define a groove therebetween;
and
wherein the CO2 laser is operated in continuous wave or pulsed with a pulse duration larger than 0.1 microseconds.

14. A component produced by the method according to claim 1, wherein a surface of the component comprises riblets.

15. The method according to claim 5, wherein the base paint layer, positioned below the top paint layer, is partially exposed by the laser radiation of the $CO_2$ laser.

16. The device according to claim 13, the device further comprising:
a $CO_2$ laser;
for generating two partial beams by splitting an original laser beam the optical assembly comprising a focusing device;
a processing head with the beam splitting device for generating two partial beams by splitting an original laser beam;
and
a movement unit;
wherein the processing head is moveable over the surface by the movement unit, and
wherein the processing head is configured to generate the intensity distribution with intensity maxima in a periodic distance L.

17. The method according to claim 1, comprising at least one the following:
the laser is excited continuously;
the laser is operated pulsed with pulse durations <1 ms.

18. The method according to claim 11, wherein a processing distance is independent from the tilt angle change δ.

19. The component according to claim 14, wherein the riblets and grooves between the riblets extend continuously in a longitudinal direction, wherein a groove distance a between two immediately neighbouring grooves changes in the longitudinal direction.

20. The method according to claim 1, further comprising at least one of the following:
neighbouring grooves have a groove distance between 40 μm and 200 μm;
the surface is formed from a paint system.

* * * * *